United States Patent
Shimizu et al.

[19]

[11] Patent Number: 5,861,921
[45] Date of Patent: Jan. 19, 1999

[54] CONTROLLING QUANTIZATION PARAMETERS BASED ON CODE AMOUNT

[75] Inventors: Tetsuya Shimizu; Nobuhiro Hoshi, both of Yokohama; Toshihiko Suzuki; Yukinori Yamamoto, both of Tokyo, all of Japan

[73] Assignee: Canon Kabushiki Kaisha, Tokyo, Japan

[21] Appl. No.: 218,632

[22] Filed: Mar. 28, 1994

[30] Foreign Application Priority Data

| Mar. 29, 1993 | [JP] | Japan | 5-093557 |
| Mar. 30, 1993 | [JP] | Japan | 5-095606 |
| Mar. 30, 1993 | [JP] | Japan | 5-095612 |
| Aug. 26, 1993 | [JP] | Japan | 5-211853 |
| Aug. 26, 1993 | [JP] | Japan | 5-211855 |

[51] Int. Cl.$^6$ ........................... A04N 7/24
[52] U.S. Cl. ........................... 348/405
[58] Field of Search ........................... 348/405, 419, 348/390, 384; 358/335, 342, 310; 360/32, 9.1, 48; H04N 7/13

[56] References Cited

U.S. PATENT DOCUMENTS

| 5,073,821 | 12/1991 | Juri | 348/405 |
| 5,150,208 | 9/1992 | Otaka et al. | 348/420 |
| 5,349,384 | 9/1994 | Oguro | 348/405 |
| 5,355,167 | 10/1994 | Juri | 348/405 |
| 5,384,787 | 1/1995 | Yoshinaka | 358/335 |
| 5,389,973 | 2/1995 | Kitamura et al. | 348/405 |
| 5,404,168 | 4/1995 | Yamada et al. | 348/405 |

FOREIGN PATENT DOCUMENTS

| 0470773 | 2/1992 | European Pat. Off. |
| 0475251 | 3/1992 | European Pat. Off. |
| 0498578 | 8/1992 | European Pat. Off. |
| 0566277 | 10/1993 | European Pat. Off. |
| WO 9209173 | 5/1992 | Germany |

*Primary Examiner*—Bryan Tung
*Attorney, Agent, or Firm*—Fitzpatrick, Cella, Harper & Scinto

[57] ABSTRACT

There is provided code amount control in which information data are input in predetermined units and a code amount is estimated in each of a plurality of stages, including a final stage. A calculation result is obtained based on a target code amount and the estimated code amount, for each stage. A short code amount and an excess code amount are updated based on the calculation result, and quantization parameters used upon encoding are controlled in accordance with the short code amount and the excess code amount obtained at the final estimation stage. Also provided is code amount control for controlling a code amount in units of second blocks, each consisting of a plurality of first blocks, each consisting of a plurality of sample value data, which discriminates quantization parameters which result in a code amount less than a predetermined amount when a second block of data is encoded using the quantization parameters. The discriminated quantization parameters are adjusted on a unit basis of the first block.

22 Claims, 28 Drawing Sheets

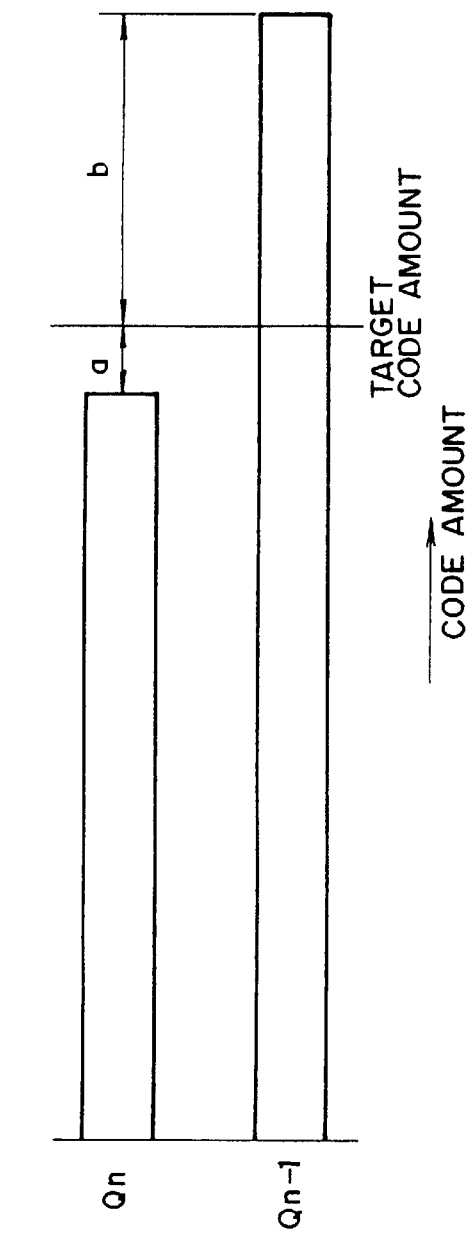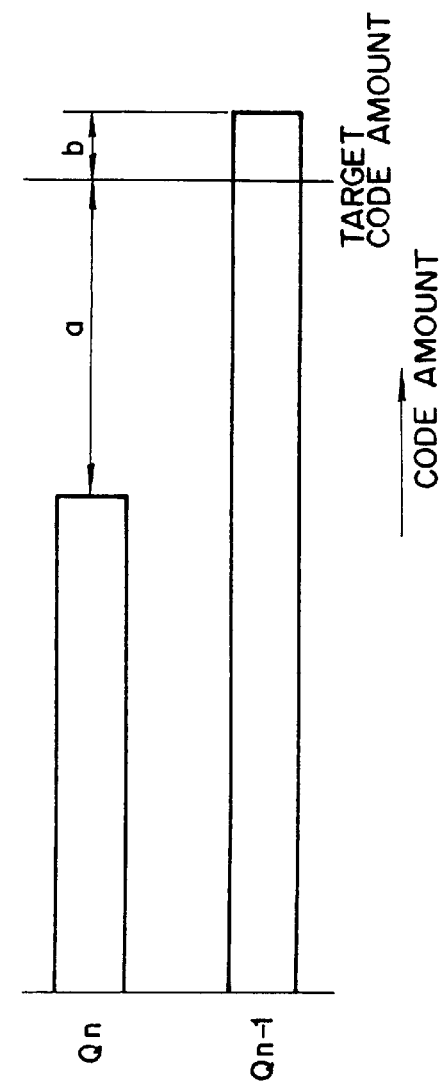
FIG. 2A
FIG. 2B

DIAGONAL DIRECTION
HIGH FREQUENCY IMAGE

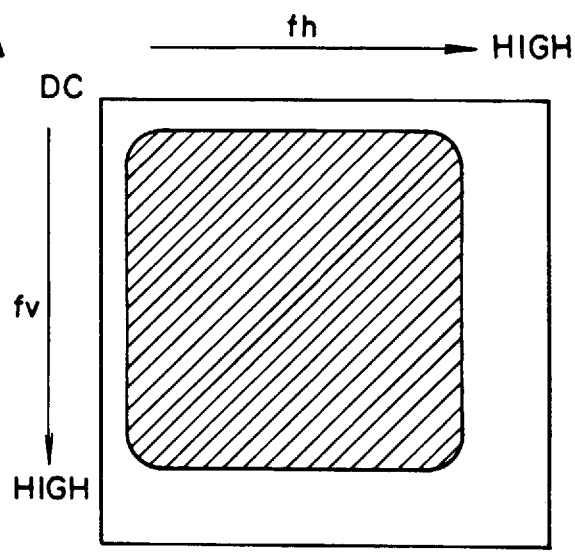
FIG. 21A
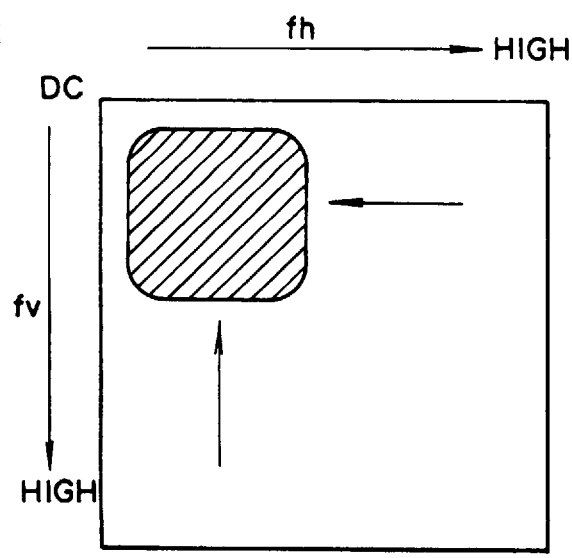
FIG. 21B

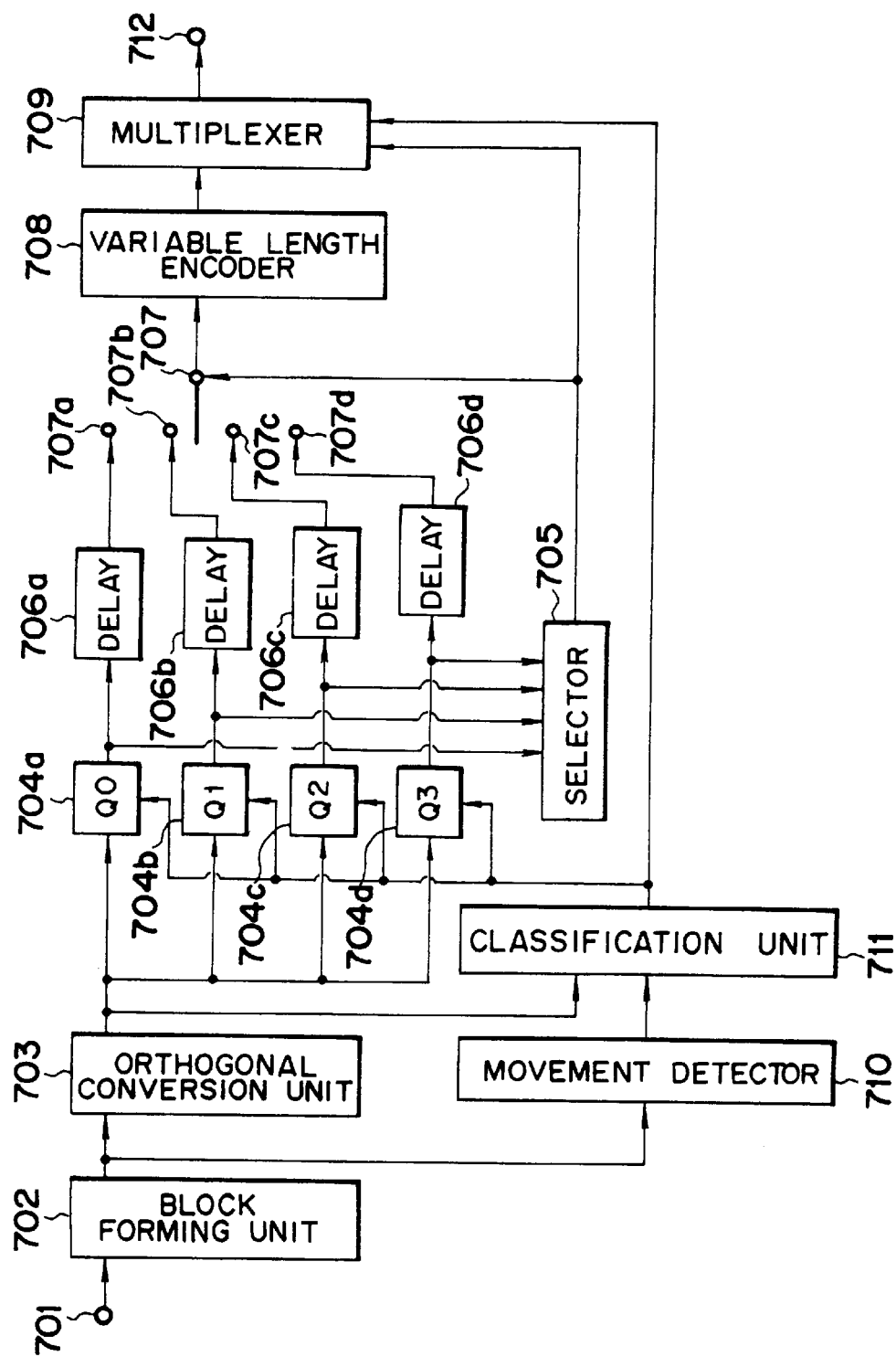

FIG. 27

| CLASS / QUANTIZER | 0 | 1 | 2 | 3 |
|---|---|---|---|---|
| Q0 | Q0 | Q1 | Q2 | Q3 |
| Q1 | Q1 | Q2 | Q3 | Q3 |
| Q2 | Q2 | Q3 | Q3 | Q3 |
| Q3 | Q3 | Q3 | Q3 | Q3 |

Q0=2
Q1=4
Q2=8
Q3=16

| CLASS / MOVEMENT | PRESENT | ABSENT |
|---|---|---|
| 0 | 1 | 0 |
| 1 | 2 | 1 |
| 2 | 3 | 2 |
| 3 | 3 | 3 |

CONTROLLING QUANTIZATION PARAMETERS BASED ON CODE AMOUNT

BACKGROUND OF THE INVENTION

1. Field of the Invention

The present invention relates to an encoding apparatus using variable length encoding and, more particularly, to code amount control.

2. Related Background Art

In recent years, commercial VTRs for encoding an image signal with high efficiency, and recording/reproducing the encoded image signal on/from a recording medium such as a magnetic tape have been proposed.

As a technique for compressing and encoding an image signal with high efficiency, an encoding apparatus using orthogonal conversion is known. In this apparatus, after an image is divided into blocks (to be referred to as discrete cosine transform (DCT) blocks hereinafter) each consisting of a predetermined number of pixels, the DCT blocks are subjected to orthogonal conversion such as DCT conversion, and converted DCT coefficients are quantized to perform, e.g., entropy encoding.

As a method of high-efficiency encoding, a variable length encoding method with a high compression ratio tends to be used.

When data is recorded on a recording medium using variable length codes, it is desirable that a predetermined number of DCT blocks have a constant information amount in consideration of a special reproduction mode, error propagation, and the like.

A conventional encoding apparatus will be described below.

FIG. 1 is a block diagram of a conventional encoding apparatus. Note that two-dimensional DCT conversion is performed in units of small-size blocks each consisting of 8 pixels (horizontal)×8 pixels (vertical) of an image signal, and the information amount is controlled to be constant in units of large-size blocks each consisting of 30 DCT blocks.

Referring to FIG. 1, a sample value of an image signal is input from an input terminal 1, and a large-size block forming circuit 2 selects 30 DCT blocks as a large-size block from 1-frame data according to an arbitrary rule.

This image signal is then supplied to a small-size block forming circuit 3, and is divided into small-size blocks each consisting of 8×8 pixels.

A sample value of the image signal divided into the small-size blocks is input to an orthogonal conversion circuit 4, and the small-size blocks are DCT-converted, thus outputting 64 conversion coefficients in units of small-size blocks.

The conversion coefficients are stored in a buffer circuit 5 in units of large-size blocks, and are also supplied to a code amount calculation circuit 7. The code amount calculation circuit 7 calculates the code amount of each large-size block upon encoding, and outputs the calculation result to a quantizer selection circuit 8.

The quantizer selection circuit 8 selects a quantizer (or a quantization table) which can achieve a predetermined code amount, i.e., a code amount equal to or smaller than a target code amount, in accordance with the input result.

A quantizer 6 quantizes the conversion coefficients delayed by the buffer circuit 5 using the quantizer selected by the quantizer selection circuit 8. The quantized conversion coefficients are subjected variable length encoding such as Huffman encoding by a variable length encoding circuit 9, and the encoded data are output from an output terminal 10.

The conventional problems will be explained below with reference to FIGS. 2A and 2B.

FIGS. 2A and 2B show the relationship among a code amount achieved by a finally selected quantizer $Q_n$, a code amount achieved by a quantizer $Q_{n-1}$ smaller by one than the quantizer $Q_n$, and a target code amount. In FIGS. 2A and 2B, arrows a and b respectively represent the differences between the target code amount and the code amounts achieved by the quantizers $Q_n$ and $Q_{n-1}$. More specifically, when data is quantized by the quantizer $Q_n$, the code amount is smaller by a than the target code amount. When data is quantized by the quantizer $Q_{n-1}$, the code amount exceeds the target code amount by b.

In the case of FIG. 2A, the value a is small, and encoding efficiency is high. However, in the case of FIG. 2B, the code amount is smaller by a considerably large value a than the target code amount, and encoding efficiency is low. In this case, the quantizer $Q_{n-1}$ is to be selected if possible. However, since the code amount quantized by the quantizer $Q_{n-1}$ slightly exceeds the target code amount by b, the quantizer $Q_n$ must be selected. In this manner, in the conventional apparatus, encoding with high efficiency cannot always be performed.

Conventional code amount control does not consider the visual characteristics of man. For example, the visual characteristics of man have steep discrimination characteristics for a relatively bright fine image, but have low identification ability for a dark fine image. Therefore, in the conventional control wherein the same quantization processing is performed for high-frequency components of low-luminance image data and those of middle- or high-luminance image data, high-frequency noise appears in a portion having a low luminance and a high degree of fineness, resulting in a visual obstacle.

Also, since the visual characteristics of man are lowered with respect to a moving image, image quality can be averaged by assigning a larger information amount to blocks with a small movement than blocks with a large movement. However, since the conventional method does not consider any movement, the above-mentioned control cannot be performed.

SUMMARY OF THE INVENTION

The present invention has been made in consideration of the above situation, and has as its object to provide a code amount control device, which can effectively use a target code amount without wasting as much as possible, and an encoding apparatus using the same.

In order to achieve the above object, according to a preferred aspect of the present invention, there is provided a code amount control device for controlling a code amount in units of second blocks each consisting of a plurality of first blocks each consisting of a plurality of sample value data, comprising quantization means for quantizing the second block data with predetermined quantization parameters, detection means for detecting a code amount of the second block data quantized by the quantization means, and control means for controlling the quantization parameters in units of first blocks in accordance with an output from the detection means.

It is another object of the present invention to provide an encoding apparatus which performs high-efficiency encoding in consideration of the visual characteristics of man.

In order to achieve the above object, according to another preferred aspect of the present invention, there is provided an encoding apparatus for dividing image information into blocks each consisting of a plurality of pixels, and encoding the image information by performing orthogonal conversion and quantization in units of blocks, comprising detection means for detecting local fineness characteristics of the image information from orthogonally converted conversion coefficients, and control means for controlling quantization characteristics in accordance with an output from the detection means.

Other objects and advantages of the invention will become apparent from the following detailed description taken in conjunction with the appended claims.

BRIEF DESCRIPTION OF THE DRAWINGS

FIGS. 2A and 2B are views for explaining conventional code amount control;

FIGS. 21A and 21B are explanatory views of a change in weighting coefficient of image characteristics;

FIG. 26 is a block diagram showing the arrangement of an encoding apparatus according to the seventh embodiment of the present invention;

FIG. 27 is a view for explaining the relationship between the classes and the quantization steps in the seventh embodiment;

DETAILED DESCRIPTION OF THE PREFERRED EMBODIMENTS

A code amount control device according to the first embodiment of the present invention will be described below.

Figure 3:
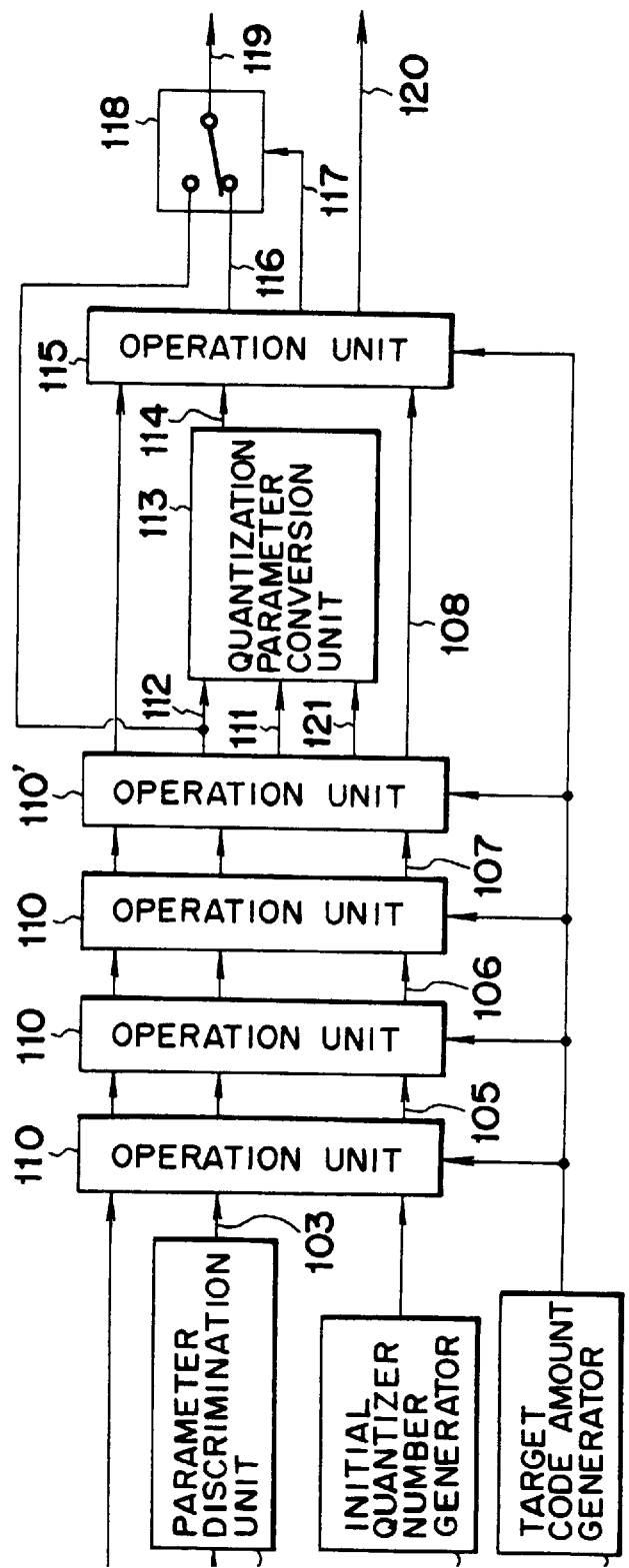
FIG. 3 is a block diagram of a code amount control device according to the first embodiment of the present invention.

FIG. 3 is a block diagram of the code amount control device of the first embodiment. Note that the code amount control device in FIG. 3 corresponds to the code amount calculation circuit in the conventional encoding apparatus.

Referring to FIG. 3, the device comprises input data 101 such as image data, a quantization parameter discrimination unit 102, quantization parameters 103, an initial quantizer number generator 104, quantizer number data 105 to 108, a target code amount generator 109, operation units 110, code amount difference data 111, nonchanged quantization parameters 112, a quantization parameter conversion unit 113, changed quantization parameters 114 and 116, an operation unit 115 for performing processing different from that in the operation unit 110, discrimination data 117 indicating a code amount discrimination result, a switch 118, final quantization parameters 119, quantizer number data 120 indicating a final quantizer (or quantization table), and data 121 indicating whether the code amount difference data 111 is difference data over or under a target code amount.

The operation from the input to the third operation unit 110 in FIG. 3 will be briefly described below.

If N quantizers are available, quantizers are numbered from 1 to N in turn from a quantizer having a smaller quantization width, and are specified by $Q_n$ (n=1 to N).

In order to determine a proper quantizer, for example, a binary search method is used. More specifically, a central quantizer $Q_{n/2}$ is selected, and quantization and variable length encoding are actually executed to calculate a code amount. If the calculated code amount is smaller than the target code amount, since a target quantizer is present between $Q_1$ and $Q_{n/2}$, a similar calculation is repeated using a quantizer $Q_{n/4}$ between these quantizers. Conversely, if the calculated code amount is larger than the target code amount, a similar calculation is repeated using a quantizer $Q_{3n/4}$. In this manner, when there are N quantizers, a target quantizer can be determined by $\log_2 N$ calculations.

Figure 4:
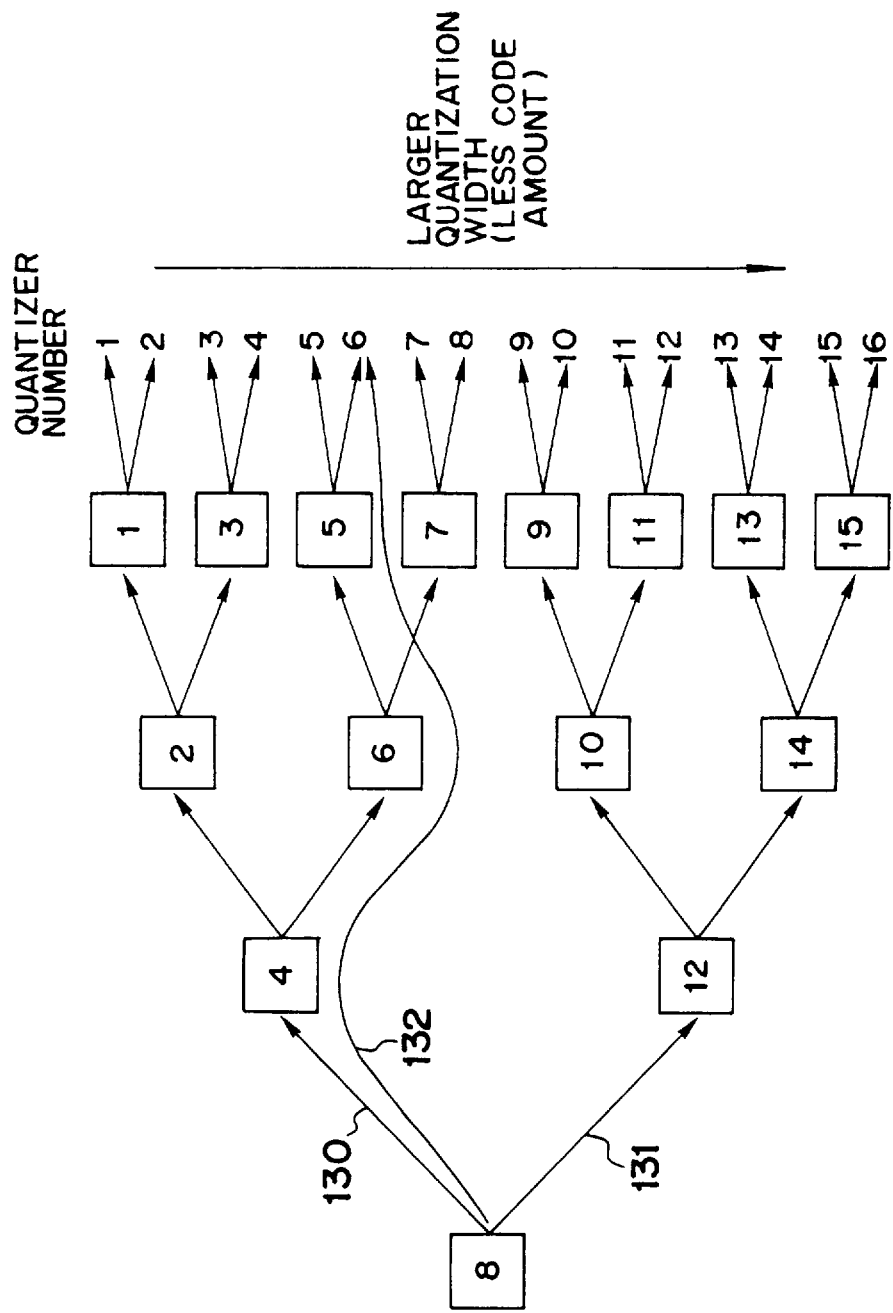
FIG. 4 is a chart showing a process until one quantizer is selected.

FIG. 4 shows a quantizer selection process when N=16.

Referring to FIG. 4, an arrow 130 indicates a selection direction when the code amount is smaller than the target code amount, and an arrow 131 indicates a selection direction when the code amount is larger than the target code amount. In FIG. 4, an arrow 132 represents a selection path until a quantizer $Q_6$ is selected.

For the sake of easy description, if the number of small-size blocks included in one large-size block is represented by k, input data 101 is assumed to have conversion coefficients for k small-size blocks.

The quantization parameter discrimination unit 102 assigns parameters representing the features of blocks to k small-size blocks, respectively, and outputs these parameters as quantization parameters 103.

When a certain quantizer $Q_n$ is selected for one large-size block, the quantization parameters 103 are used for control not to quantize all the k small-size blocks included in the large-size block by a single quantizer $Q_n$, but to select quantizers (e.g., $Q_{n+2}$, $Q_{n+1}$, $Q_{n-1}$, $Q_{n-2}$, and the like) relatively slightly shifted from the quantizer $Q_n$ to the small-size blocks.

The operation units 110 and 110' are portions for performing the above-mentioned one calculation cycle. The first operation unit 110 receives the input data 101, the quantization parameters 103, initial quantizer number data from the initial quantizer number generator 104, and the target code amount from the target code amount generator 109, and calculates a code amount for one large-size block (k small-size blocks). Then, the first operation unit 110 outputs a quantizer number 105 to be used in a calculation of the next operation unit.

Upon repetition of this calculation by the operation units 110 and 110', quantizer number data 108 for one large-size block is obtained.

Since this embodiment has 16 different quantizers, one quantizer number data can be obtained by the four operation units 110 and 110'. In this case, the initial quantizer number generator 104 supplies data indicating quantizer number 8 to the first operation unit 110 (see FIG. 4).

The quantization parameter conversion unit 113 changes some of k quantization parameters 112 corresponding to the k small-size blocks in accordance with the absolute value of code amount difference data 111 output from the operation unit 110' to bring the calculated code amount close to the target code amount. The unit 113 then outputs changed quantization parameters 114. The operation unit 115 calculates a code amount again using the quantization parameters 114 and the quantizer number data 108 obtained by the operation unit 110'.

As a result of this calculation, if the calculated code amount is equal to or smaller than the target code amount, i.e., if discrimination data 117 is minus, changed new quantization parameters 116 (equal to the quantization parameters 114) are output as final quantization parameters 119 via the switch 118.

On the contrary, if the calculated code amount exceeds the target code amount, i.e., if the discrimination data 117 is plus, the nonchanged quantization parameters 112 (equal to the quantization parameters 103) are output as the final quantization parameters 119. In the latter case, encoding efficiency cannot be improved.

The arrangement and operation of the operation units 110 and 110' will be described below.

Figure 5:
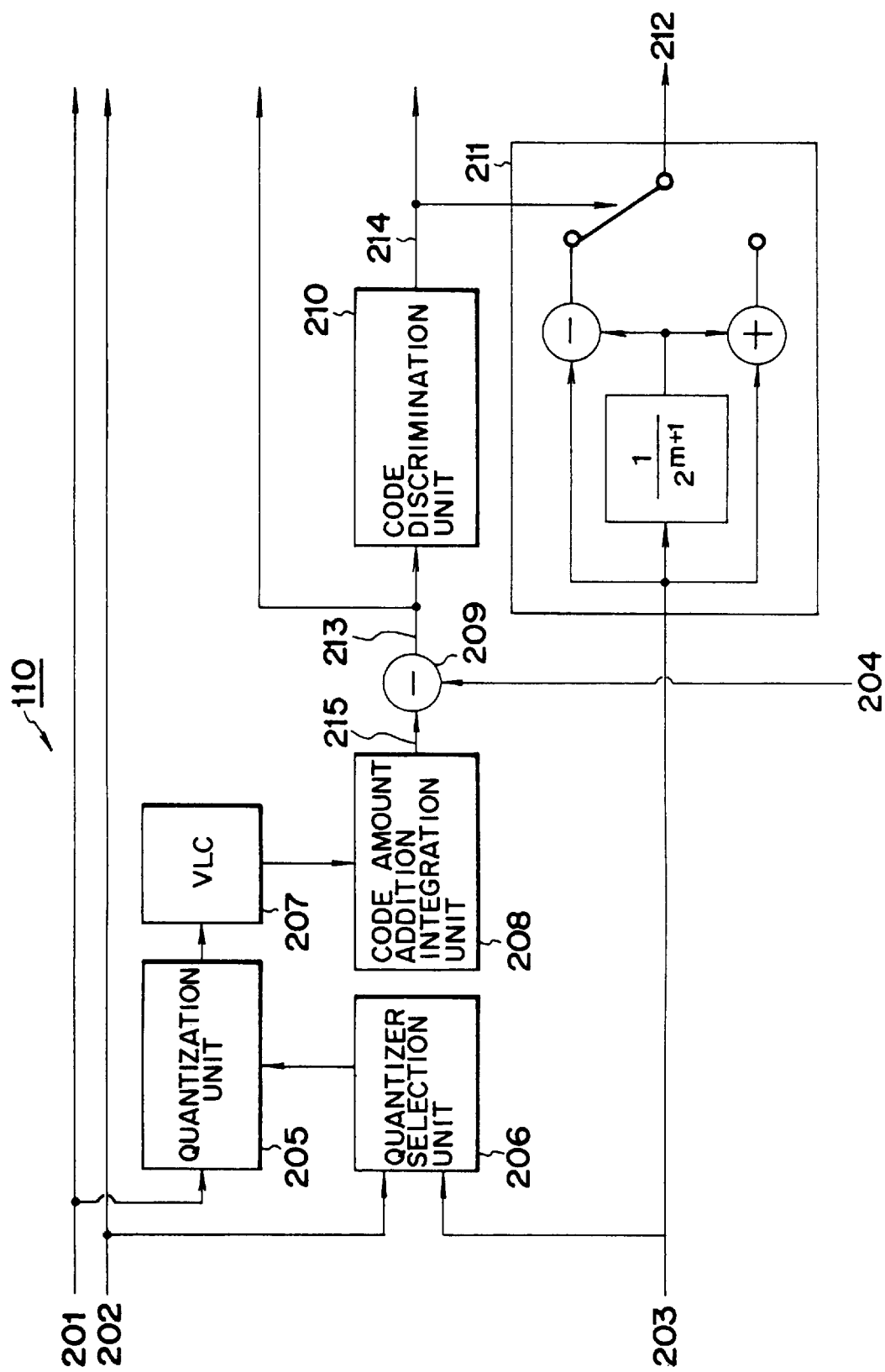
FIG. 5 is a block diagram showing the arrangement of operation units 110 and 110' in FIG. 3.

FIG. 5 is a block diagram showing the arrangement of the operation units 110 and 110'.

Referring to FIG. 5, the operation unit 110 (110') comprises input data 201 such as image data, quantization parameters 202, input quantizer number data 203, target code amount data 204, a quantization unit 205, a quantizer selection unit 206, a variable length encoding unit 207, a code amount addition integration unit 208, a subtracter 209, a code discrimination unit 210, a quantizer number selection unit 211, output quantizer number data 212, code amount difference data 213, discrimination data 214 indicating the discrimination result of the code discrimination unit 210, and actual code amount data 215.

Note that the operation unit 110' outputs code amount difference data 213 and discrimination data 214 to an external circuit, but the operation unit 110 does not output them to an external circuit.

The operation of the operation unit 110 with the above arrangement will be described below.

The quantizer selection unit 206 selects one quantizer or quantization table in accordance with quantizer number data 203 and quantization parameters 202, and the quantization unit 205 quantizes input data 201 using the selected quantizer or quantization table.

Since the input data 201 includes conversion coefficients for one large-size block, i.e., for k small-size blocks, and the quantization parameters 202 are changed in units of small-size blocks, the quantizer selection unit 206 shifts the quantizer or quantization table to be selected in accordance with these data.

The variable length encoding unit 207 performs variable length encoding of the quantized data, and outputs the code length of the encoded data to the code amount addition integration unit 208.

The code amount addition integration unit 208 adds and integrates the input code lengths for the k small-size blocks, and outputs an actual code amount of the large-size block corresponding to the input quantizer number data 203 to the subtracter 209. The subtracter 209 subtracts target code amount data 204 from the output data 215 from the code amount addition integration unit 208, and outputs code amount difference data 213.

When the code amount difference data 213 is plus, it indicates that quantization by the current quantizer number generates too large a code amount; when it is minus, it indicates that the code amount is small.

Thus, the code discrimination unit 210 discriminates the polarity (i.e., plus or minus) of the code amount difference data 213. The quantizer number selection unit 211 converts the quantizer number data 203 in accordance with discrimination result data 214 from the code discrimination unit 210, and outputs output quantizer number data 212 to the next circuit.

The operation of the quantizer number selection unit 211 will be described in detail below.

If the input quantizer number is represented by n, the selection unit 211 selects $n+(N/2^{m+1})$ when the code amount is over the target code amount; it selects $n-(N/2^{m+1})$ when the code amount is under the target code amount.

Note that N indicates the number of quantizers, and m indicates the m-th stage of the operation units shown in FIG. 3. In FIG. 3, N=16 and m=1 to 4. In the operation unit 110', the output quantization number becomes a value below the decimal point, and it is rounded to n+1 when the code amount is over the target code amount; it is rounded to n when the code amount is under the target code amount.

The arrangement and operation of the operation unit 115 will be described below.

Figure 6:
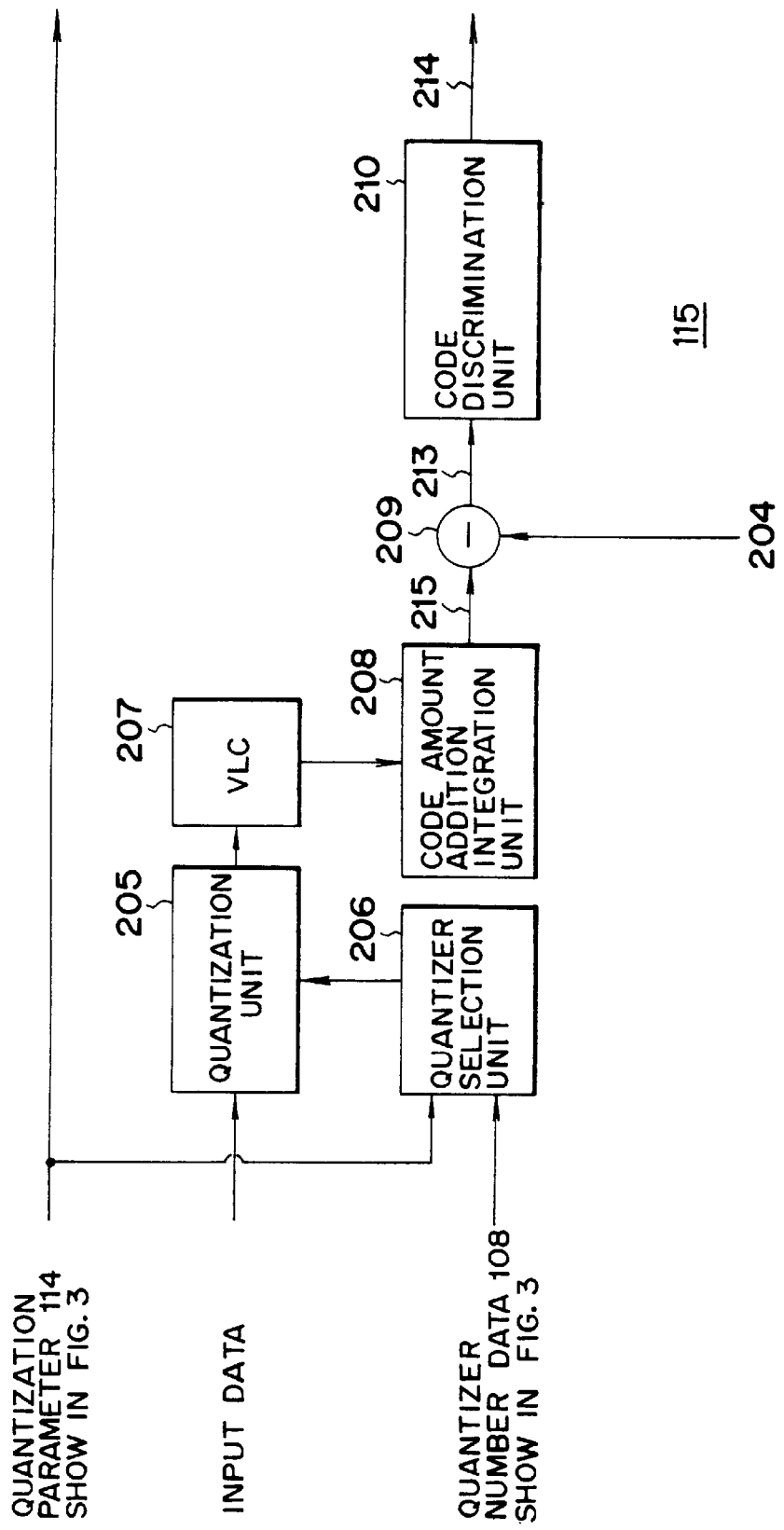
FIG. 6 is a block diagram showing the arrangement of an operation unit 115 in FIG. 3.

FIG. 6 is a block diagram showing the arrangement of the operation unit 115 in FIG. 3. Note that the same reference numerals in FIG. 6 denote the same parts as in FIG. 5, and a detailed description thereof will be omitted.

The quantizer selection unit 206 selects one quantizer or quantization table in accordance with the quantizer number data 108 and the quantization parameters 114. The quantization unit 205 quantizes input data (same as the input data 101 in FIG. 3) using the selected quantizer or quantization table. Note that the quantization parameters 114 are output to the next circuit (corresponding to the quantization parameters 116 in FIG. 3).

Since the input data includes conversion coefficients for one large-size block, i.e., for k small-size blocks, and the quantization parameters 202 are changed in units of small-size blocks, the quantizer selection unit 206 shifts the quantizer or quantization table to be selected in accordance with these data.

The variable length encoding unit 207 performs variable length encoding of the quantized data, and outputs the code length of the encoded data to the code amount addition integration unit 208.

The code amount addition integration unit 208 adds and integrates the input code lengths for the k small-size blocks, and outputs an actual code amount of the large-size block corresponding to the input quantizer number data 108 to the subtracter 209. The subtracter 209 subtracts target code amount data 204 from the output data 215 from the code amount addition integration unit 208, and outputs code amount difference data 213.

When the code amount difference data 213 is plus, it indicates that quantization by the current quantizer number generates too large a code amount; when it is minus, it indicates that the code amount is small.

Thus, the code discrimination unit 210 discriminates the polarity (i.e., plus or minus) of the code amount difference data 213, and outputs discrimination data 214 (corresponding to the discrimination data 117 in FIG. 3) according to the discriminated polarity.

The operation of the quantization parameter conversion unit 113 in FIG. 3 will be described below.

Figure 7:
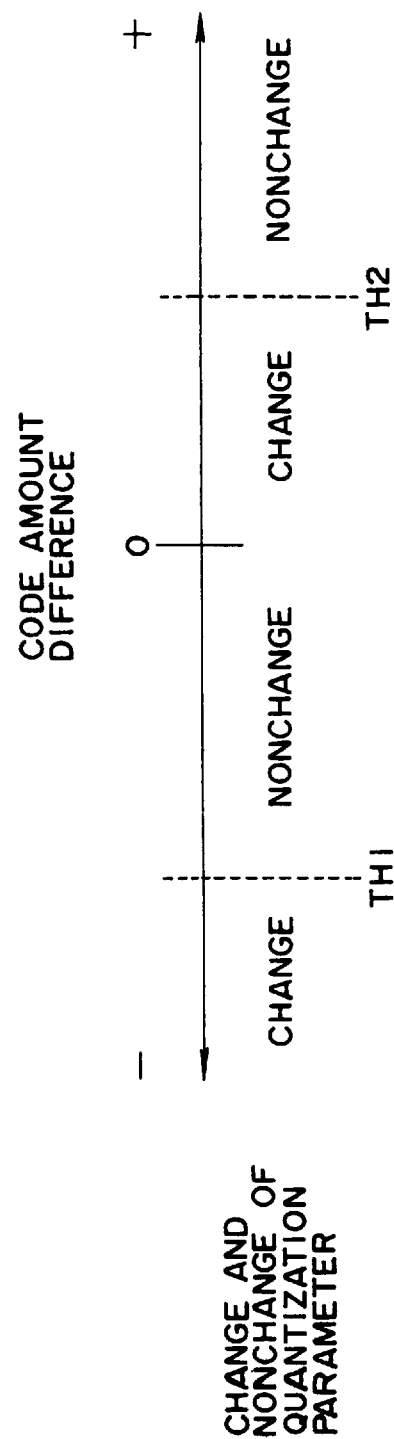
FIG. 7 is a view for explaining the operation of a quantization parameter conversion unit 113 in FIG. 3.

FIG. 7 is a view for explaining the operation of the quantization parameter conversion unit 113 in FIG. 3.

When the code amount difference data 111 is minus, since this value corresponds to FIG. 2A, the quantization parameters are changed when the difference data is equal to or negatively larger than a threshold value TH1. When the difference data falls within a range from 0 to TH1, it is determined that efficiency is sufficiently high, and the quantization parameters are not changed.

When the code amount difference data 111 is plus, this value corresponds to FIG. 2B. In this case, since the code amount is over the target code amount, a calculation for a quantizer smaller by 1 than the quantizer number data 108 obtained by the fourth operation unit 110' is performed. In this case, when the difference value is equal to or larger than a threshold value TH2, the quantization parameters are changed; when the difference data falls within a range from 0 to TH2, the quantization parameters are not changed.

The quantization parameters can be changed by the following method. That is, some of k parameters corresponding to the k small-size blocks are selected, and are changed in a direction to increase the code amount. For example, when the k small-size blocks consist of a luminance signal and color difference signals, the quantization parameters of blocks of the luminance signal which largely influences image quality can be changed.

A code amount control device according to the second embodiment of the present invention will be described below.

Figure 8:
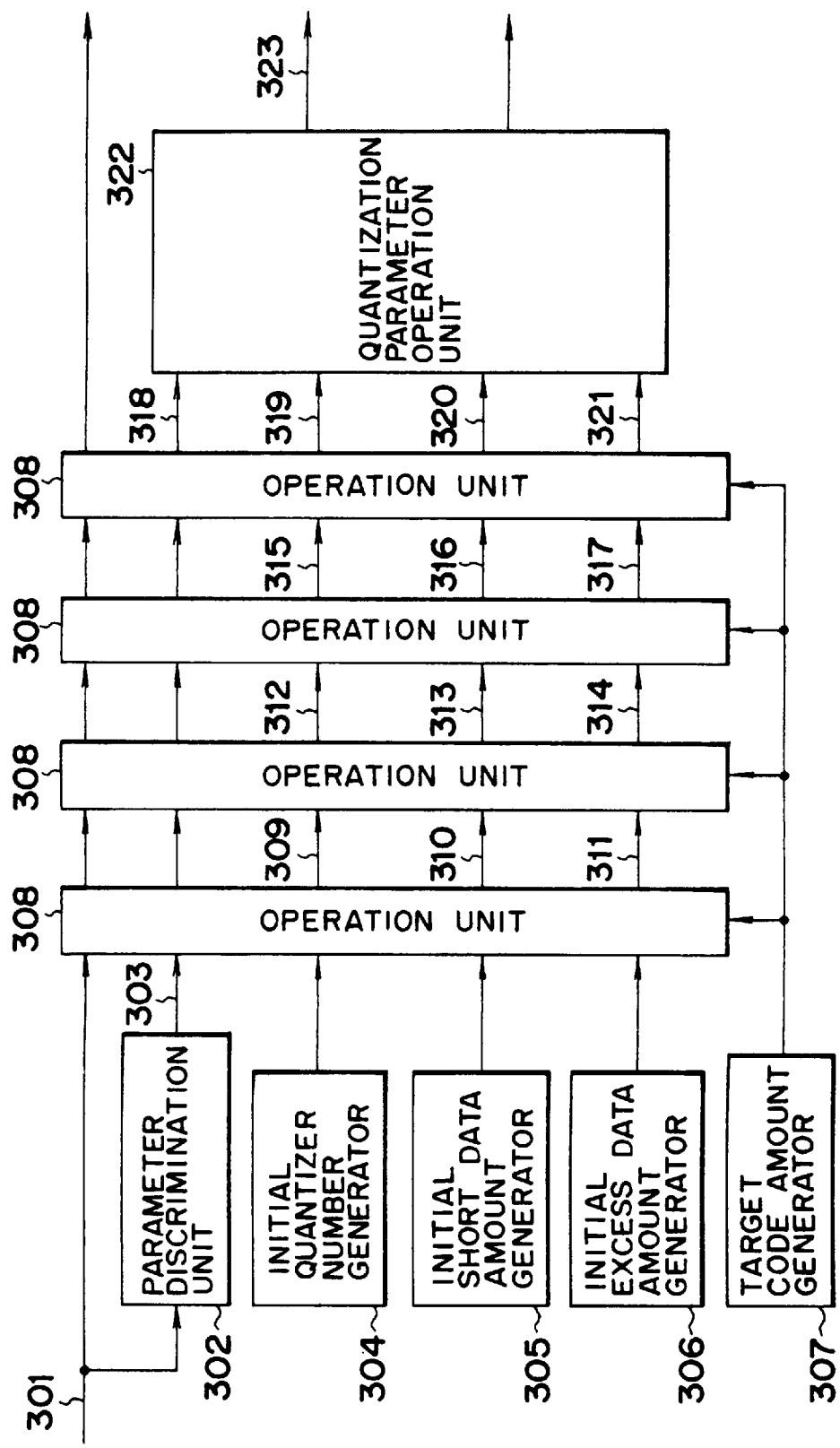
FIG. 8 is a block diagram of a code amount control device according to the second embodiment of the present invention.

FIG. 8 is a block diagram of the code amount control device of the second embodiment. Note that the code amount control device shown in FIG. 8 corresponds to the code amount calculation circuit in the conventional encoding apparatus.

Referring to FIG. 8, the code amount control device comprises input data 301 such as image data, a quantization parameter discrimination unit 302, quantization parameters 303, an initial quantization number generator 304, an initial short data amount generator 305, an initial excess data amount generator 306, a target code amount generator 307, operation units 308, quantizer number data 309, 312, 315, and 319, short data amounts (signal lines) 310, 313, 316, 320, excess data amounts (signal lines) 311, 314, 317, and 321, quantization parameters 318 before operation, a quantization parameter operation unit 322, and quantization parameters 323 after operation.

Each operation unit 308 will be briefly described below.

In this case, the second operation unit will be exemplified.

A code amount calculation is performed based on quantizer number data 309, and one of a short data amount 310 or an excess data amount 311 input from the previous operation unit is updated. The updated data amount is output to the next operation unit as a short data amount 313 or an excess data amount 314. The short/excess data amount represents the difference between a code amount obtained based on the current quantizer number and a target code amount.

The above-mentioned operation is performed by the operation units 308, and a final short or excess data amount 320 or 321 is obtained. Strictly speaking, if a quantizer indicated by finally determined quantizer number data 319 is represented by $Q_n$, the data 320 represents a short data amount from the target code amount upon execution of encoding using the quantizer $Q_n$, and the data 321 represents an excess data amount from the target code amount upon execution of encoding using a quantizer $Q_{n-1}$. These data amounts respectively correspond to FIGS. 2A and 2B.

The quantization parameter operation unit 322 operates quantization parameters 318 (which have the same contents as those of the quantization parameters 303 but are delayed) using the short/excess data amount, and outputs new quantization parameters 323. The quantization parameters 323 are parameters for instructing to use quantizers relatively shifted from the quantizer $Q_n$ in units of small-size blocks with respect to the quantizer $Q_n$ which is selected in units of large-size blocks. The code amount can be finely adjusted by operating some of k parameters.

The arrangement and operation of each operation unit 308 will be described below.

Figure 9:
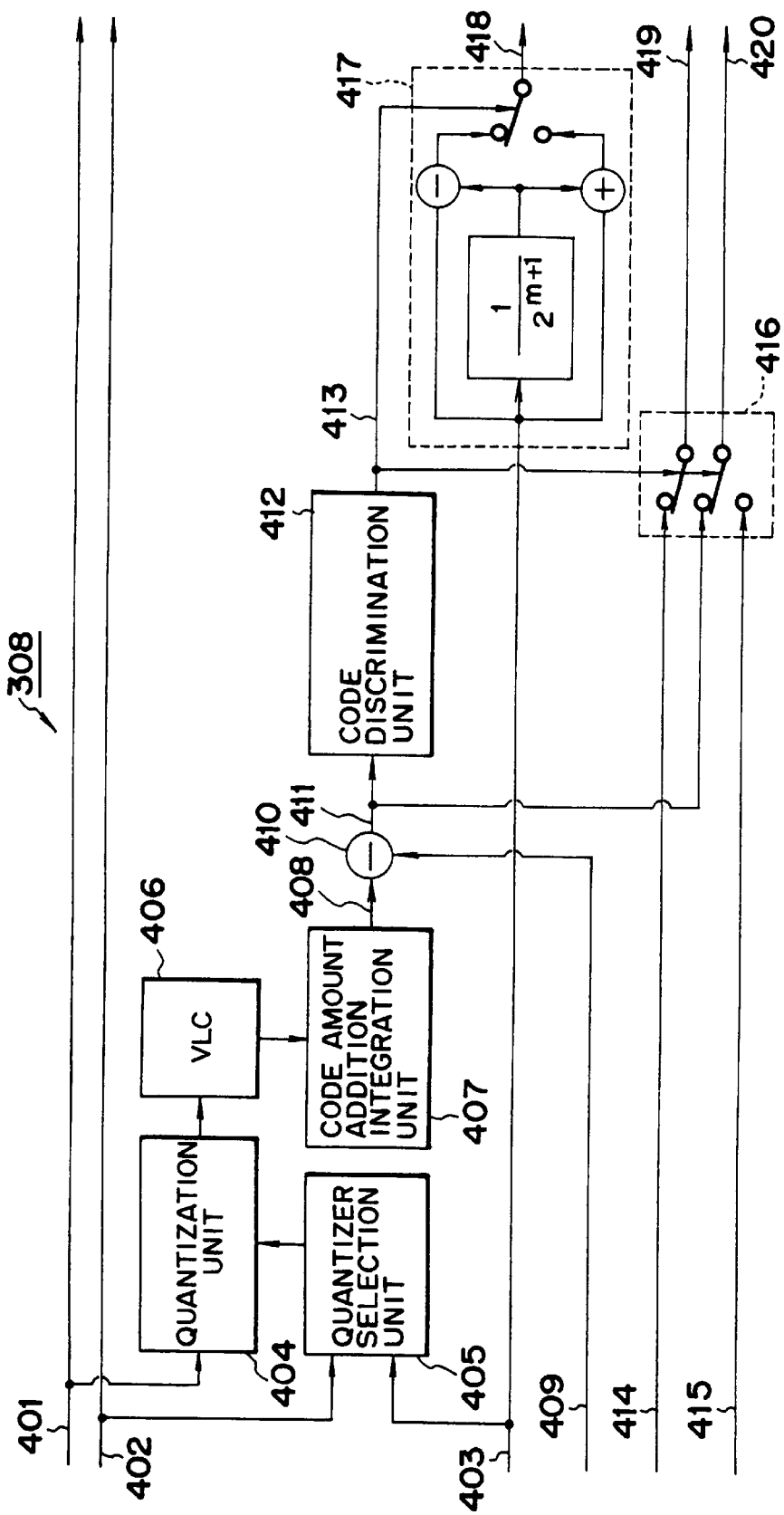
FIG. 9 is a block diagram showing the arrangement of an operation unit 308 in FIG. 8.

FIG. 9 is a block diagram showing the arrangement of the operation unit 308.

Referring to FIG. 9, the operation unit 308 comprises input data 401, quantization parameters 402, an input quantizer number 403, a quantization unit 404, a quantizer selection unit 405, a variable length encoding unit 406, a code amount addition integration unit 407, an actual code amount (output line) 408, a target code amount 409, a subtracter 410, a code amount difference 411, a code discrimination unit 412, data 413 indicating the code discrimination result, an input short data amount 414, an input excess data amount 415, a switch 416, a quantizer number selection unit 417, an output quantizer number 418, an output short data amount (output line) 419, and an output excess data amount (output line) 420.

Note that the units having the same names as those in FIG. 5 described in the first embodiment perform the same operations.

The code amount addition integration unit 407 outputs an actual code amount corresponding to the input quantizer number 403 onto the output line 408. The subtracter 410 subtracts the target code amount 409 from the actual code amount 408, and outputs a code amount difference 411. The code discrimination unit 412 discriminates the sign, i.e., the polarity (plus or minus) of the code amount difference 411.

The switch 416 updates either the input short data amount 414 or excess data amount 415 with the code amount difference 411 in accordance with data 413 output from the code discrimination unit 412, and outputs the updated data amount onto one of the output lines 419 and 420. The data amount which is not updated is directly output. For example, when the code amount is over the target code amount, the short data amount 414 is directly output, and the excess data amount 415 is output after it is replaced with the data amount difference 411, which exceeds the target code amount, by this operation unit.

With this arrangement, the target short/excess data amount is obtained on the signal line 320 or 321 via the four operation units 308 in FIG. 8. This will be described below with reference to FIG. 4. In FIG. 4, the arrow 132 indicates a process until the quantizer $Q_6$ is selected. Following this arrow in the reverse direction, it can be understood that code amount calculations for quantizers $Q_6$ and $Q_5$ are performed in the fourth and third stages, and a target data amount is obtained.

Another case ($Q_9$) will be examined below. A short data amount by the quantizer $Q_9$ is obtained in the fourth stage, and an excess data amount by the quantizer $Q_8$ is obtained in the first stage. In particular, the excess data amount in the first stage is transmitted to the last stage without being rewritten in middle stages since the code amount does not exceed the target code amount in the second to fourth stages. Note that in only the cases of $Q_1$ and $Q_{16}$, since either of a short or excess data amount is not calculated at all, a correct result cannot be obtained.

Figure 10:
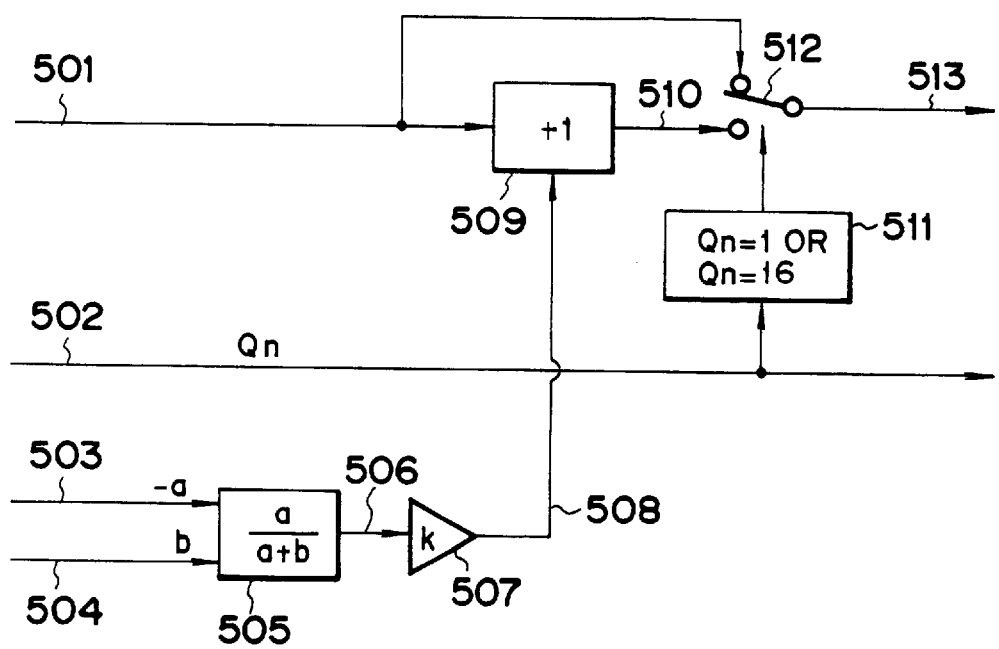
FIG. 10 is a block diagram showing the arrangement of a quantization parameter operation unit 322 in FIG. 8.

FIG. 10 is a block diagram showing the detailed circuit of the quantization parameter operation unit 322 shown in FIG. 8. The quantization parameter operation unit 322 comprises input quantization parameters 501, a selected quantizer number ($Q_n$) 502, a short data amount 503, an excess data amount 504, a divider 505, a multiplier 507, an adder 509, a comparator 511, a switch 512, and output quantization parameters 513.

If the input short and excess data amounts 503 and 504 are respectively represented by a and b (a≧0, b≧0) in correspondence with FIGS. 2A and 2B, the divider 505 calculates a/(a+b), and outputs a ratio 506 of the current short data amount to an increase in code amount when the quantizer number is decreased by 1. Decreasing the quantizer number by 1 is equivalent to operating all k quantization parameters without changing the quantizer number so as to shift the quantizer number of each small-size block in a direction to decrease by 1. This ratio 506 is multiplied with k by the multiplier 507, thus obtaining the number of parameters to be operated of the k parameters.

The adder 509 operates the quantization parameters. More specifically, in this case, assume that the quantizer is shifted to one smaller by 1 by increasing parameters by 1. Of the input k quantization parameters 501, the parameter values of parameters corresponding to the number of parameters designated by the output 508 from the multiplier 507 are increased by 1 by the adder 509, and the updated parameters are output as new parameters 510.

The comparator 511 checks if the quantizer number 502 is 1 or 16. If the quantizer number is 1 or 16, since the above-mentioned problem is posed, the switch 512 outputs the parameters 501 before operation. In this embodiment, the number of parameters designated by the output 508 from the multiplier 507 is defined by the ratio 506. However, in practice, since the code amount may exceed the target code amount, the number of parameters is preferably set to be a slightly small value.

When the adder 509 increases the quantization parameter values, the order of small-size blocks to be operated may be determined by the following methods. For example, when blocks include a Y signal and color difference signals, the blocks are operated in turn from the block corresponding to the Y signal. Alternatively, a block whose quantization parameter value is large is operated later, i.e., blocks are operated in turn from one having a small parameter value.

The second embodiment has been described. The basic principle of the present invention will be described again below. To operate to select a quantizer in which all the k quantization parameters of small-size blocks are smaller by 1 is equivalent to using the quantizer number $Q_{n-1}$ in place of the quantizer number $Q_n$ of the overall large-size block without operating quantization parameters at all. Therefore, when 0 to k quantization parameters are operated, quantizers $Q_n$ to $Q_{n-1}$ are equivalently obtained.

A code amount control device according to the third embodiment of the present invention will be described below.

First, an encoding apparatus having the code amount control device of this embodiment will be described.

Figure 11:
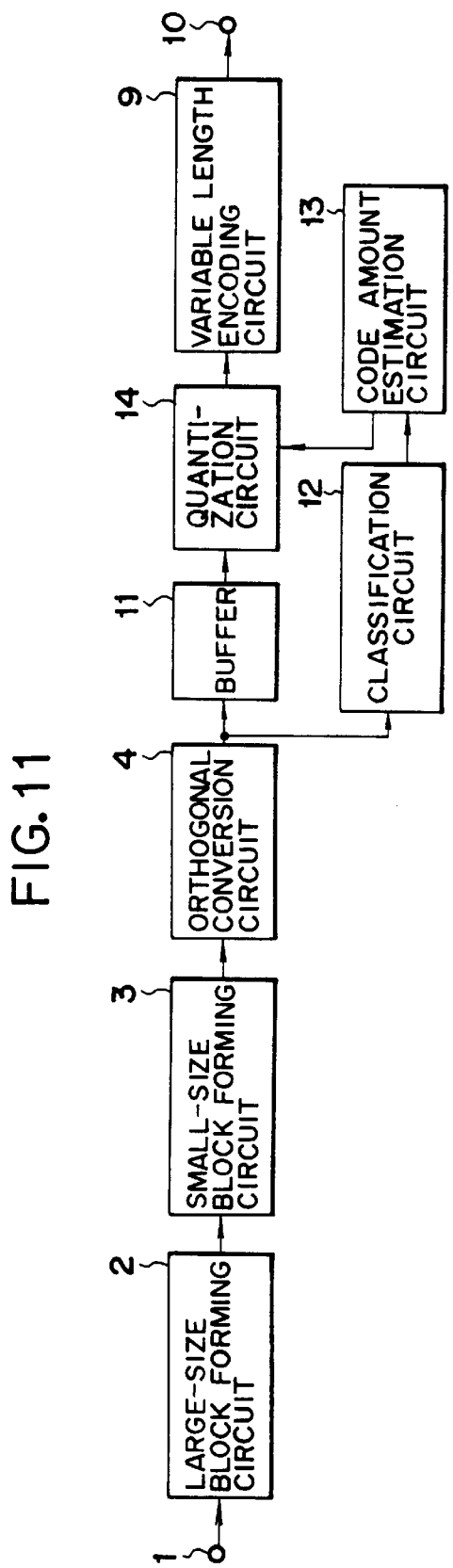
FIG. 11 is a block diagram showing the arrangement of an encoding apparatus according to the third embodiment of the present invention.

FIG. 11 is a block diagram showing the encoding apparatus according to the third embodiment. The same reference numerals in FIG. 11 denote the same parts as in FIG. 1, and a detailed description thereof will be omitted.

Figure 1:
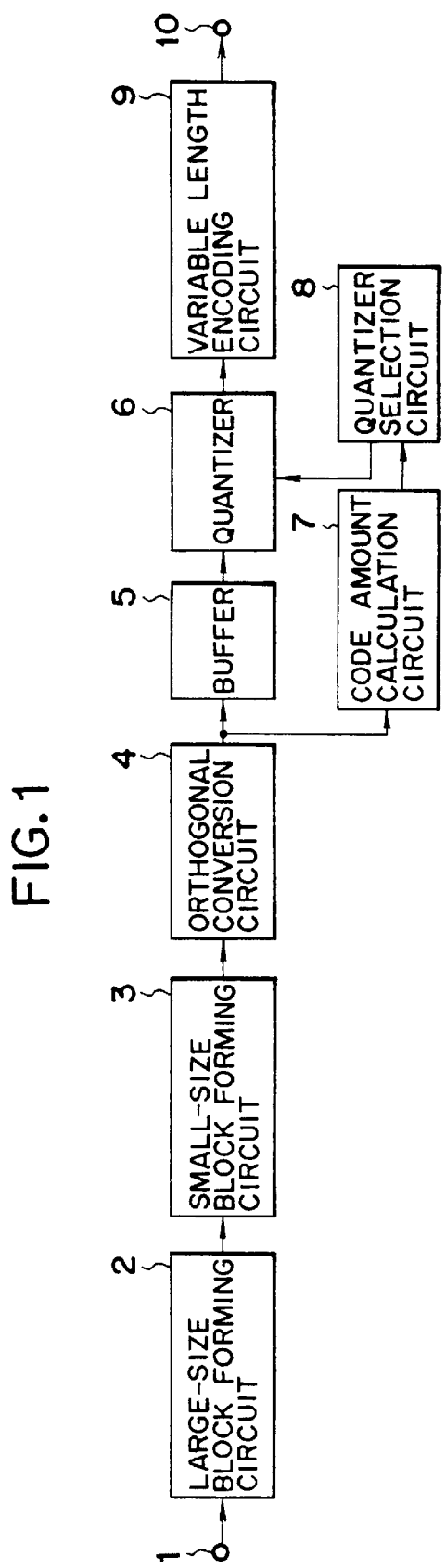
FIG. 1 is a block diagram of a conventional encoding apparatus.
Figure 12:
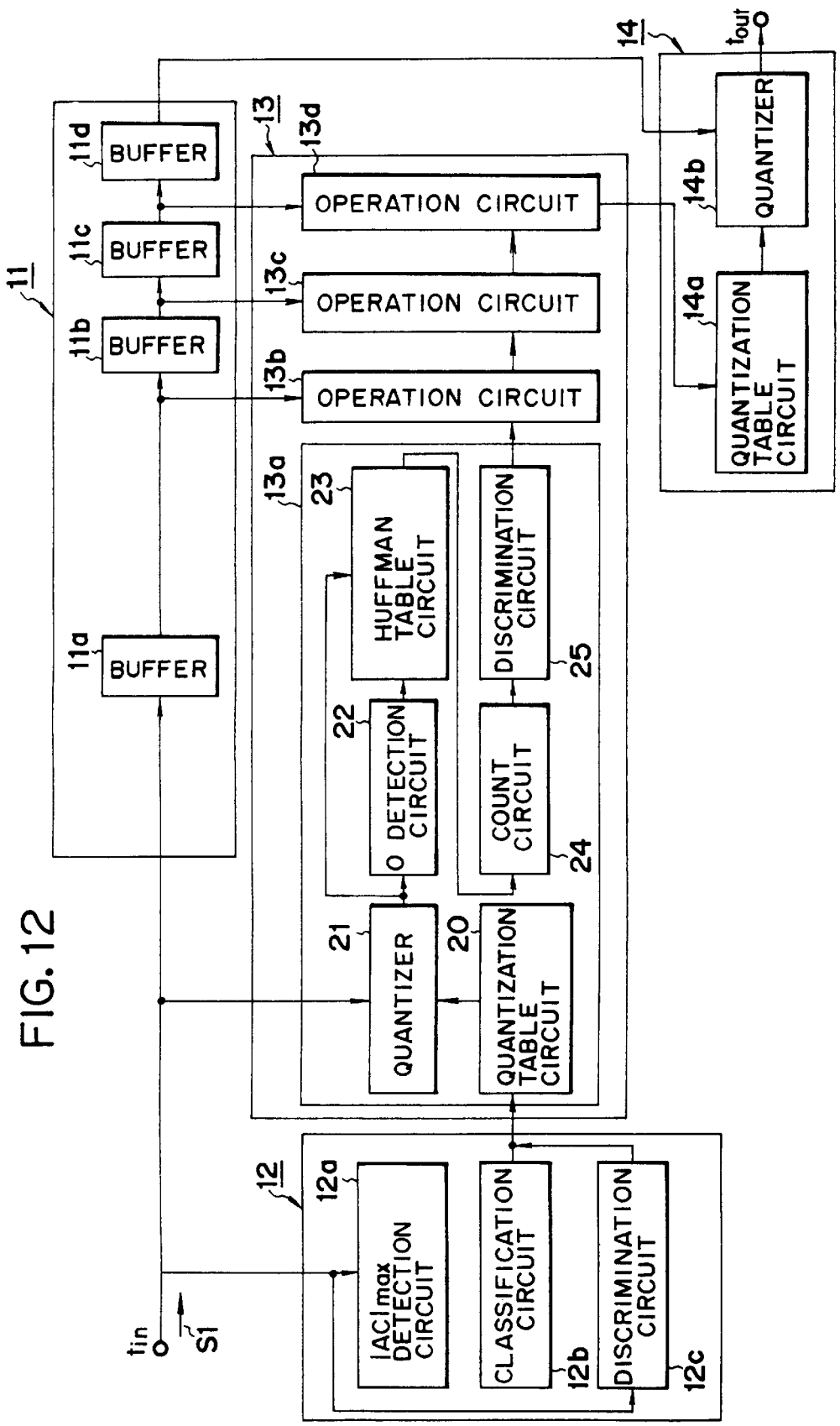
FIG. 12 is a block diagram showing the arrangement of main part of the encoding apparatus shown in FIG. 11.

More specifically, the difference between the encoding apparatus of this embodiment and the conventional encoding apparatus shown in FIG. 1 is that a buffer circuit 11, a classification circuit 12, a code amount estimation circuit 13, and a quantization circuit 14 are arranged. FIG. 12 is a block diagram showing the detailed arrangements of these circuits.

The encoding method of this embodiment will be described in detail below with reference to the accompanying drawings and tables. Table 1 below shows an example to which the present invention is applied, and summarizes offset amounts corresponding to quantization Nos. when quantizers are selected in units of small-size blocks by assigning offsets to the quantization No. of a large-size block on a single table in correspondence with Y/Cr/Cb.

TABLE 1

|   | Y  | Cr | Cb |
|---|----|----|----|
| 0 | −1 | −1 | −1 |
| 1 |    |    |    |
| 2 | 0  | −1 | −1 |
| 3 |    |    |    |
| 4 | 0  | 0  | −1 |
| 5 |    |    |    |

TABLE 1-continued

| | Y | Cr | Cb |
|---|---|---|---|
| 6 | 0 | 0 | 0 |
| 7 | | | |
| 8 | | | |
| 9 | | | |
| 10 | +1 | 0 | 0 |
| 11 | | | |
| 12 | +1 | +1 | 0 |
| 13 | | | |
| 14 | +1 | +1 | +1 |
| 15 | | | |

Table 2 is a quantization table used in this embodiment, and Table 3 is a table showing constant offset amounts corresponding to class information.

TABLE 2

| Band | 1 | 2 | 3 | 4 |
|---|---|---|---|---|
| -3 | 1/32 | 1/32 | 1/32 | 1/32 |
| -2 | 1/16 | 1/32 | 1/32 | 1/32 |
| -1 | 1/16 | 1/16 | 1/32 | 1/32 |
| 0 | 1/16 | 1/16 | 1/16 | 1/32 |
| 2 | 1/8 | 1/16 | 1/16 | 1/16 |
| 3 | 1/8 | 1/8 | 1/16 | 1/16 |
| 4 | 1/8 | 1/8 | 1/8 | 1/16 |
| 5 | 1/8 | 1/8 | 1/8 | 1/8 |
| 6 | 1/4 | 1/8 | 1/8 | 1/8 |
| 7 | 1/4 | 1/4 | 1/8 | 1/8 |
| 8 | 1/4 | 1/4 | 1/4 | 1/8 |
| 9 | 1/4 | 1/4 | 1/4 | 1/4 |
| 10 | 1/2 | 1/4 | 1/4 | 1/4 |
| 11 | 1/2 | 1/2 | 1/4 | 1/4 |
| 12 | 1/2 | 1/2 | 1/2 | 1/4 |
| 13 | 1/2 | 1/2 | 1/2 | 1/2 |
| 14 | 1 | 1/2 | 1/2 | 1/2 |
| 15 | 1 | 1 | 1/2 | 1/2 |
| 16 | 1 | 1 | 1 | 1/2 |
| 17 | 1 | 1 | 1 | 1 |

TABLE 3

| Class | 1 | 2 | 3 | 4 |
|---|---|---|---|---|
| Y | +1 | 0 | -1 | -2 |
| Cr | 0 | -1 | -2 | -2 |
| Cb | -1 | -2 | -2 | -2 |

In this embodiment, two-dimensional DCT conversion is performed in units of small-size blocks each consisting of 8 pixels (horizontal)×8 pixels (vertical) of an input image signal, and the information amount is controlled to be constant in units of large-size blocks each consisting of 30 DCT blocks.

The encoding apparatus according to this embodiment will be described below with reference to FIG. 12.

FIG. 12 is a block diagram showing the arrangement of main part of the encoding apparatus shown in FIG. 11.

Referring to FIG. 12, a sample value of a signal S1 input from an input terminal $t_{in}$ is divided into large-size blocks by selecting 30 DCT blocks in units of 1-frame data according to an arbitrary rule, and each large-size block is divided into small-size blocks each consisting of 8×8 pixels. The small-size blocks are subjected to two-dimensional DCT conversion, and 64 conversion coefficients are output in units of small-size blocks.

The conversion coefficients S1 are supplied to the buffer circuit 11, and are also supplied to the classification circuit 12. The buffer circuit 11 comprises a plurality of buffer circuits 11a, 11b, 11c, and 11d, and the input conversion coefficients are sequentially delayed in units of large-size blocks.

The classification circuit 12 comprises an |AC| max detection circuit 12a and a classification circuit 12b. The |AC| max detection circuit 12a obtains, e.g., a maximum amplitude value of the 63 coefficients excluding a DC component in units of small-size blocks, and the classification circuit 12b classifies the small-size blocks into four classes in accordance with the values obtained by the |AC| max detection circuit 12a. The classification circuit 12 also comprises a discrimination circuit 12c for discriminating which one of Y/Cr/Cb an input signal is, and outputs an identification signal indicating the discrimination result of the discrimination circuit 12c and the class information.

Figure 13:
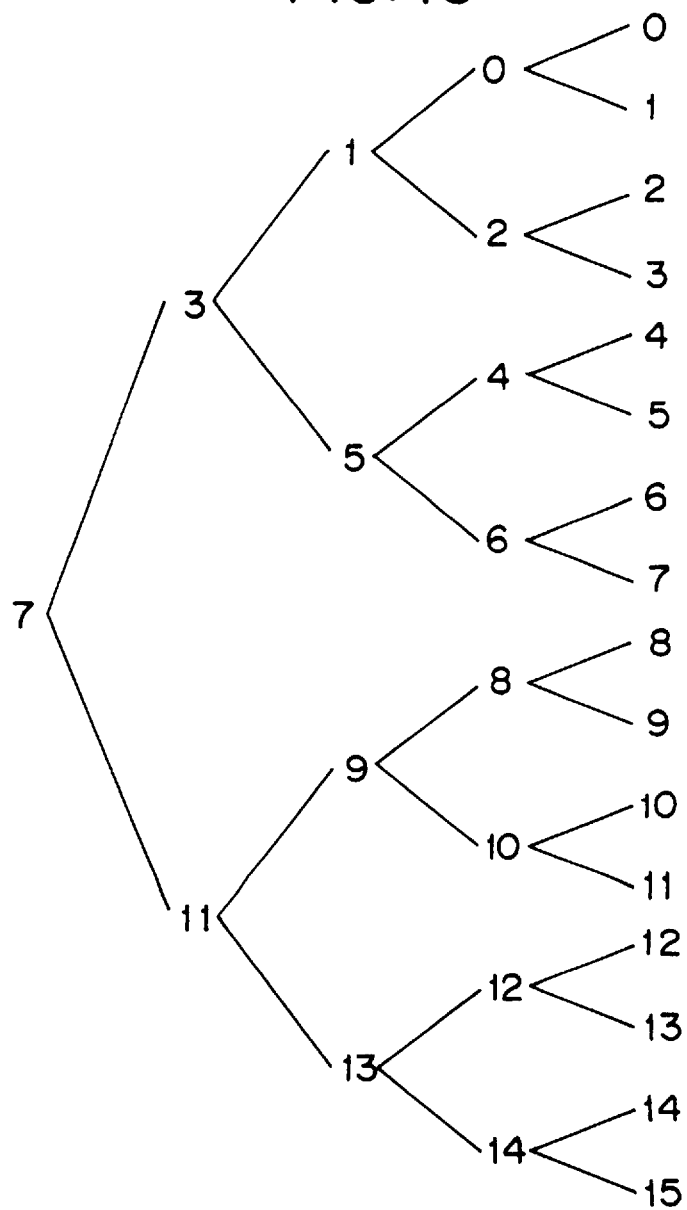
FIG. 13 is a chart showing a quantization No. binary search process according to the third embodiment.

Thereafter, for example, as shown in FIG. 13, the code amount estimation circuit 13 performs an estimation calculation of a code amount using a binary search method with respect to quantization Nos. Note that the code amount estimation circuit 13 of this embodiment comprises operation circuits 13a, 13b, 13c, and 13d which have the same arrangement.

A quantization table circuit 20 arranged in each of the operation circuits 13a, 13b, 13c, and 13d receives the class information and the Y/Cr/Cb identification signal discriminated by the classification circuit 12, and offsets shown in Table 3 corresponding to quantization Nos. are assigned to a quantization table of quantization No. 7 based on the class information and the Y/Cr/Cb identification signal in units of small-size blocks on the quantization table (an orthogonally converted coefficient region is divided into four bands to constitute a two-dimensional table) shown in Table 2.

Furthermore, offsets corresponding to quantization Nos. shown in Table 1 are assigned based on the quantization No. and the Y/Cr/Cb identification signal. For example, since a small-size block corresponding to class information 3 and Cb yields 7-2+0=5, it is quantized based on a table of quantization No. 5.

The quantization steps selected by the quantization table circuit 20 are supplied to a quantizer 21 in units of four divided bands of the small-size blocks. The quantizer 21 quantizes the input conversion coefficients S1 with the quantization steps supplied from the quantization table circuit 20. The quantization results are supplied to a 0 detection circuit 22 for detecting a run of coefficients "0" and a Huffman table circuit 23, thereby outputting a code length obtained upon execution of two-dimensional Huffman encoding based on the run length and the amplitude.

The code length obtained upon execution of two-dimensional Huffman encoding is supplied to a count circuit 24 connected to the output side of the Huffman table 23. The count circuit 24 adds and integrates code amounts after Huffman encoding, and outputs the integrated result to a discrimination circuit 25. The discrimination circuit 25 compares the input integrated result with a predetermined information amount, and supplies the comparison result to the next operation circuit 13b.

The operation circuit 13b selects a quantization table in accordance with the result from the operation circuit 13a. For example, when the table of quantization No. 7 is selected in the operation circuit 13a, and when the code amount exceeds the predetermined information amount, as shown in FIG. 13, the operation circuit 13b estimates the code amount of each large-size block by assigning offsets in units of small-size blocks to a table of quantization No. 11 as in the operation circuit 13a. On the other hand, when the code amount does not exceed the predetermined information amount, the operation circuit 13b similarly estimates the code amount of each large-size block by assigning offsets in units of small-size blocks to a table of quantization No. 3. Then, the operation circuit 13b compares the estimated code amount with the predetermined information amount, thereby determining a quantization No. of the next stage.

The same operations as described above are performed in the subsequent operation circuits 13c and 13d, thereby determining a quantization No. corresponding to an information amount which does not exceed the predetermined information amount but is closest thereto. Then, the code amount estimation circuit 13 supplies the determined quantization No. to the quantization circuit 14. The quantization circuit 14 comprises a quantization table circuit 14a and a quantizer 14b. The quantization table circuit 14a determines quantization steps on the basis of the determined quantization No., the class information, and the Y/Cr/Cb identification signal, and outputs them to the quantizer 14b.

The quantizer 14b receives the conversion coefficients which are delayed by a time corresponding to code amount estimation by the buffer circuit 11, and finally quantizes the conversion coefficients with the quantization steps supplied from the quantization table circuit 14a. The quantized coefficients are output from an output terminal $t_{out}$. Thereafter, the quantized coefficients are subjected to variable length encoding such as two-dimensional Huffman encoding by a variable length encoding circuit 9 connected to the output side of the quantization circuit 14.

An encoding method according to the fourth embodiment of the present invention will be described below. In the third embodiment described above, as shown in Table 1, offsets are defined by assigning a priority order to Y/Cr/Cb in correspondence with the quantization No. However, when the orthogonally transformed coefficient region are divided into some bands, offsets may be defined in correspondence with bands.

Table 4 below shows an example of offsets corresponding to quantization Nos. when the coefficient region is divided into four bands.

TABLE 4

| Band | 1 | 2 | 3 | 4 |
|---|---|---|---|---|
| 0 1 | −1 | −1 | −1 | −1 |
| 2 3 | 0 | −1 | −1 | −1 |
| 4 5 | 0 | 0 | −1 | −1 |
| 6 7 | 0 | 0 | 0 | −1 |
| 8 9 | +1 | 0 | 0 | 0 |
| 10 11 | +1 | +1 | 0 | 0 |
| 12 13 | +1 | +1 | +1 | 0 |
| 14 15 | +1 | +1 | +1 | +1 |

In this embodiment, when quantization tables are selected in units of small-size blocks, substantially the same processing as in the third embodiment is executed except that processing using Table 1 is replaced by that using Table 4, and a detailed description thereof will be omitted.

Also, offset amounts corresponding to quantization Nos. may be defined in correspondence with both Y/Cr/Cb and the bands of the coefficient region.

As described above, according to the third and fourth embodiments, the information amount obtained after encoding of each large-size block is controlled to be close to a predetermined value, and a selection method of quantizers corresponding to natures in units of small-size blocks is changed in accordance with the quantization characteristics of a quantizer selected in units of large-size blocks. Therefore, optimal quantizers can be selected in units of small-size blocks in accordance with the quantization characteristics of a quantization table determined in units of large-size blocks by defining quantization parameters such as class information while assigning a priority order to Y/Cr/Cb, the bands of the coefficient region, and the like in consideration of the visual characteristics.

The fifth embodiment of the present invention will be described in detail below with reference to the accompanying drawings.

Figure 14:
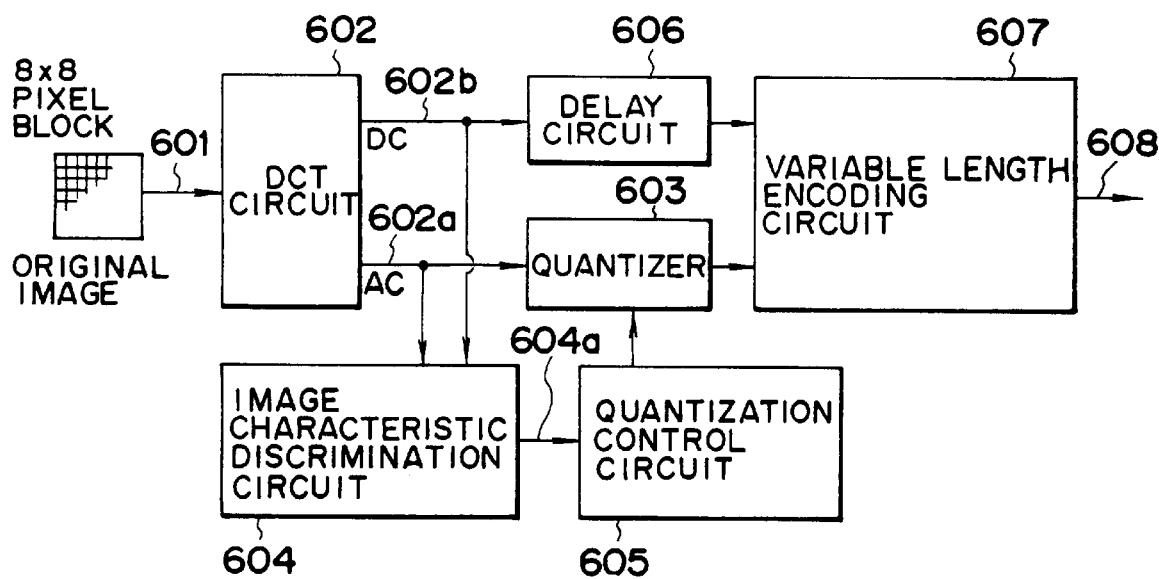
FIG. 14 is a block diagram showing the arrangement of an encoding apparatus according to the fifth embodiment of the present invention.

FIG. 14 is a block diagram showing the arrangement of an encoding apparatus according to the fifth embodiment. Referring to FIG. 14, original image data 601 to be encoded is divided into blocks each consisting of 8 pixels×8 lines in units of frames. The encoding apparatus shown in FIG. 14 comprises a DCT circuit 602 for performing DCT conversion of the image data 601 divided into blocks, and outputting AC components 602a of DCT coefficients, a quantizer 603 for quantizing the AC components 602a, an image characteristic discrimination circuit 604 for discriminating fineness characteristics of an image on the basis of the outputs 602a and a DC component 602b of DCT coefficients output from the DCT circuit 602, and outputting a discrimination result 604a, a quantization control circuit 605 for controlling the quantization characteristics of the quantizer 603 in accordance with the discrimination result from the image characteristic discrimination circuit 604, a delay circuit 606 for delaying the DC component 602b of the DCT coefficients output from the DCT circuit 602 by a time corresponding to the processing time of the quantizer 603, and a variable length encoding circuit 607 for performing variable length encoding of the outputs from the quantizer 603 and the delay circuit 606, and outputting encoded data 608.

Figure 15:
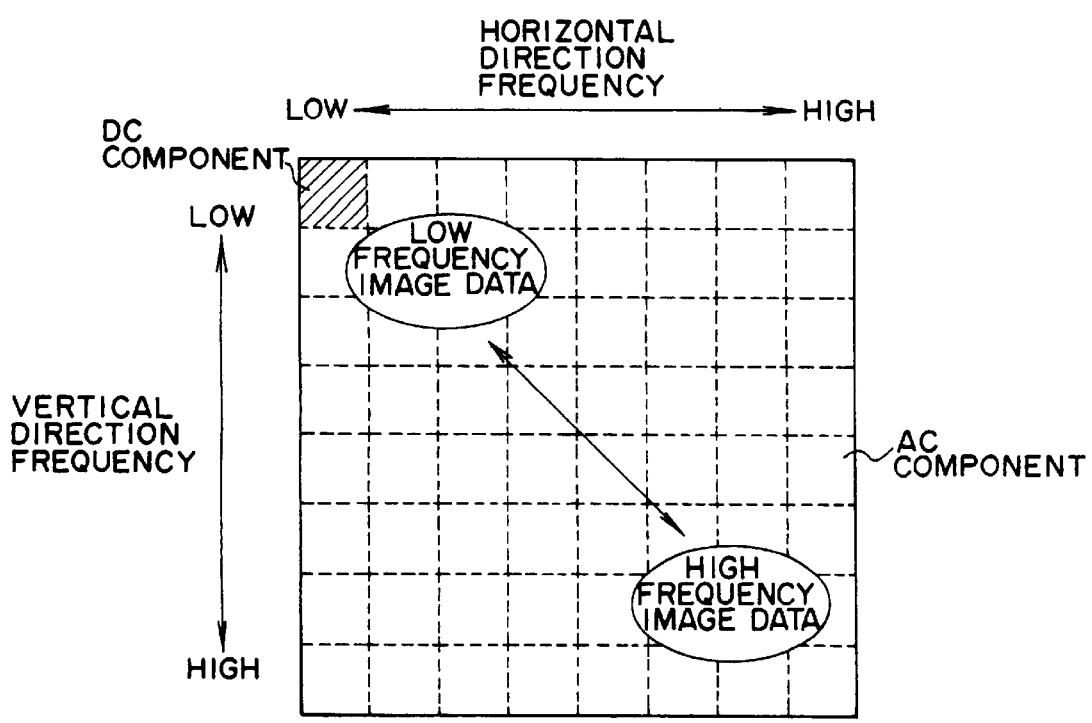
FIG. 15 is a view for explaining DCT conversion coefficient data and image characteristics.

The DCT circuit 602 performs two-dimensional DCT conversion of the original image data 601, and outputs 64 conversion coefficient data (including one DC component indicating an average luminance level of 64 pixels, and 63 AC components), as shown in FIG. 15. The AC components 602a are supplied to the quantizer 603 and the image characteristic discrimination circuit 604, and the DC component 602b is supplied to the delay circuit 606 and the image characteristic discrimination circuit 604.

Figure 16:
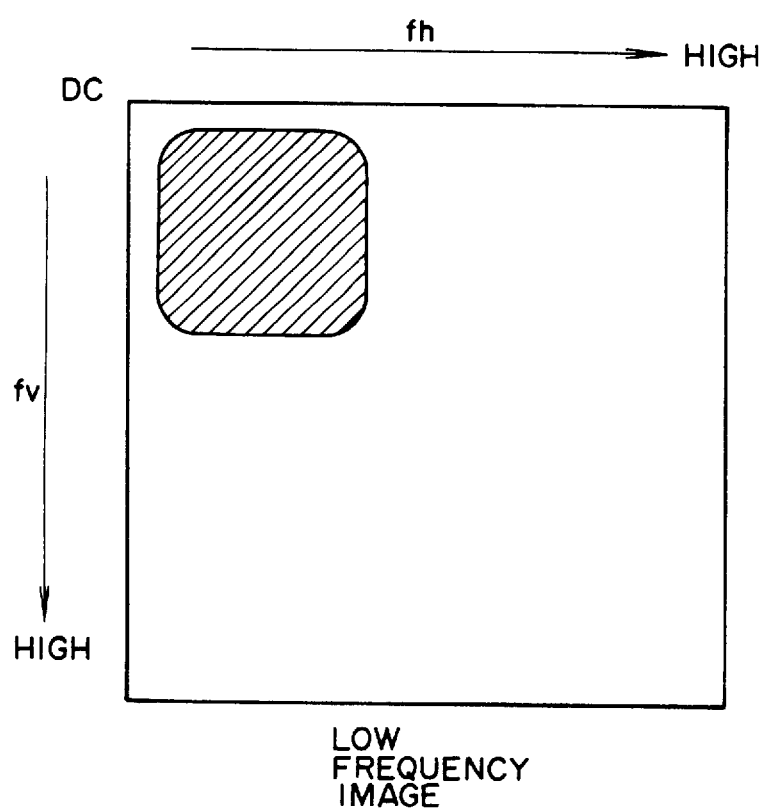
FIG. 16 is a view showing the distribution of significant coefficients of AC components in a low-frequency image.
Figure 17:
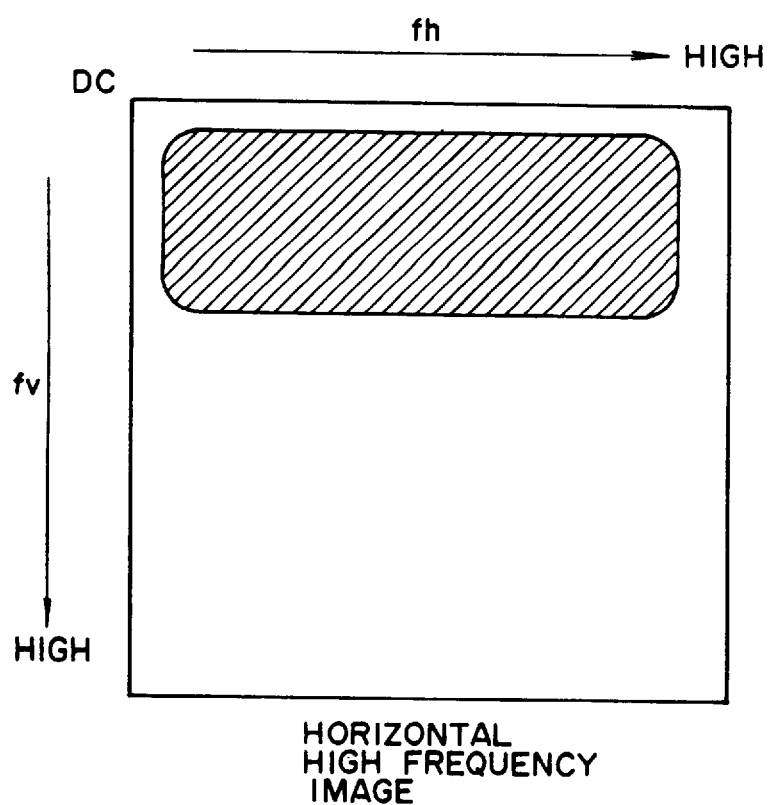
FIG. 17 is a view showing the distribution of significant coefficients of AC components in a horizontal high-frequency image.
Figure 18:
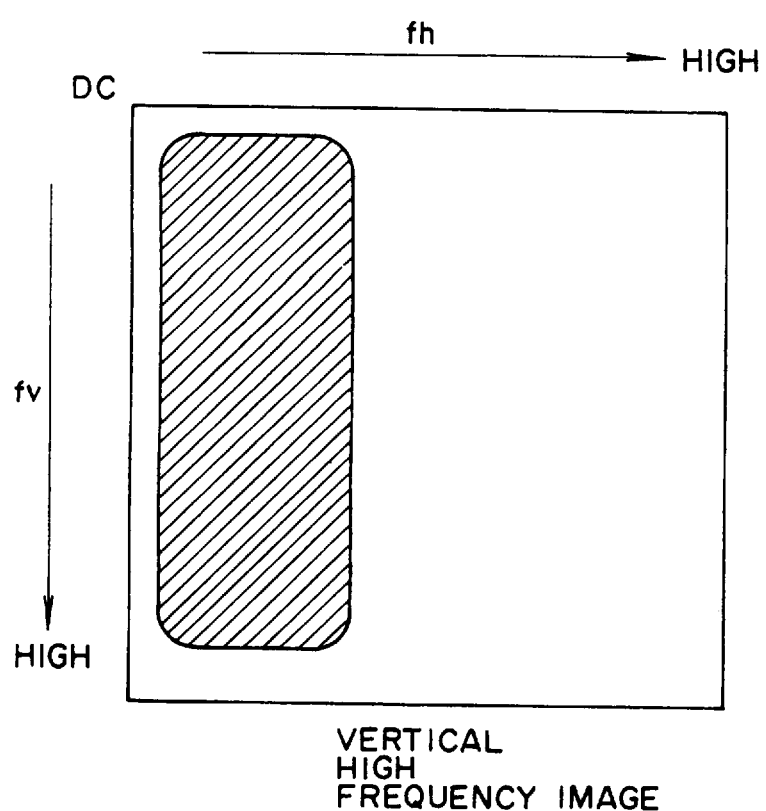
FIG. 18 is a view showing the distribution of significant coefficients of AC components in a vertical high-frequency image.
Figure 19:
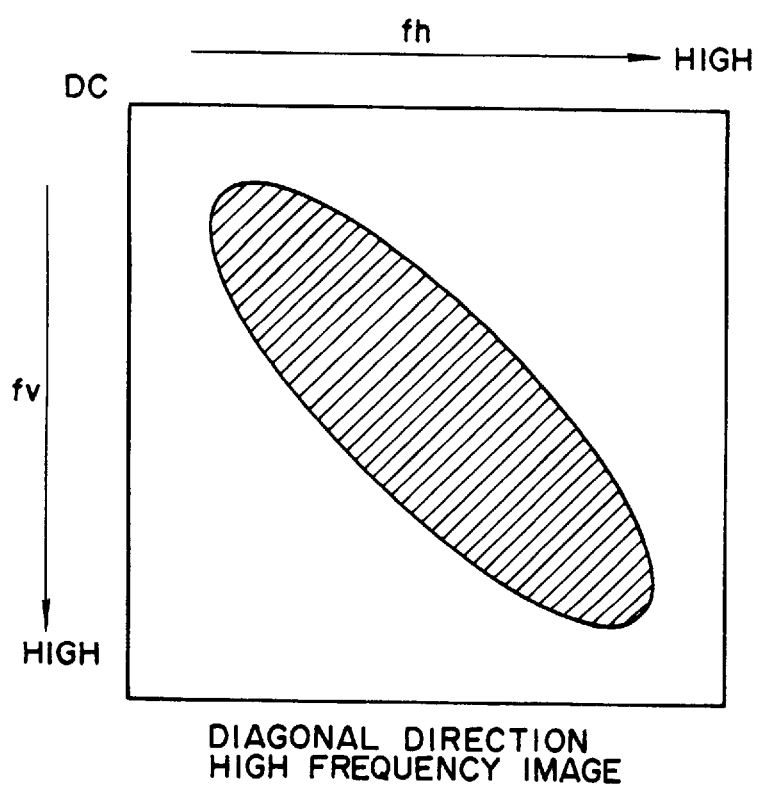
FIG. 19 is a view showing the distribution of significant coefficients of AC components in a diagonal direction high-frequency image.

The image characteristic discrimination circuit 604 discriminates the activity level of an image, i.e., the local degree of fineness, from the AC components 602a and the DC component 602b. The image characteristic discrimination circuit 604 calculates the distribution state of high-frequency significant coefficients of image data from the AC components 602a, and discriminates based on the calculation result if the input image corresponds to a low-frequency image shown in FIG. 16, a horizontal high-frequency image shown in FIG. 17, a vertical high-frequency image shown in FIG. 18, or a diagonal direction high-frequency image shown in FIG. 19.

Figure 20:
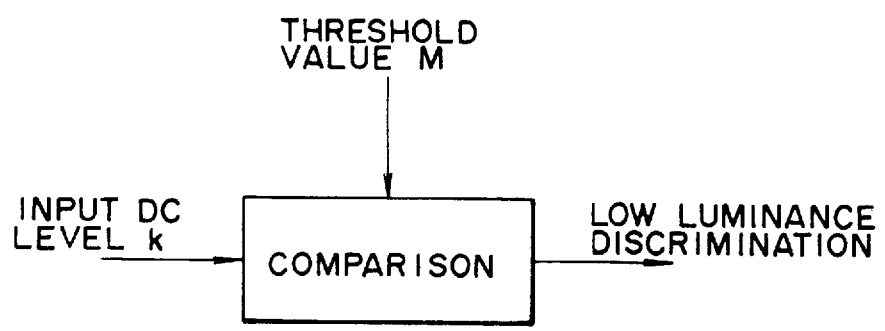
FIG. 20 is a circuit diagram for realizing image characteristic discrimination based on DC components by an image characteristic discrimination circuit 604 in FIG. 14.

Furthermore, the image characteristic discrimination circuit 604 discriminates the local luminance level of the image from the DC component 602b. More specifically, the circuit 604 compares a level K of the DC component 602b with a low-luminance discrimination threshold value M using a comparator arrangement shown in FIG. 20, and discriminates a low luminance when K≦M. When the circuit 604 discriminates the low luminance based on the DC component 602b, it changes the activity level discriminated based on the AC components 602a to the low-frequency side, as shown in FIGS. 21A and 21B. In other words, the circuit 604 decreases weighting coefficients for high-frequency portions by a predetermined value or more. Thus, a discrimination result indicating a fine image (FIG. 21A) is changed to a discrimination result indicating a low-frequency image (FIG. 21B).

Of course, when a low-frequency image is originally detected based on the AC components 602a, this discrimination result is not influenced by the evaluation result of the DC component 602b.

The quantization control circuit 605 sets proper quantization characteristics according to the discrimination result 604a from the image characteristic discrimination circuit 604 in the quantizer 603. The quantizer 603 quantizes the AC components 602a output from the DC circuit 602, and the delay circuit 606 delays the DC component 602b output from the DCT circuit 602 by a time corresponding to the processing time of the quantizer 603.

Figure 22:
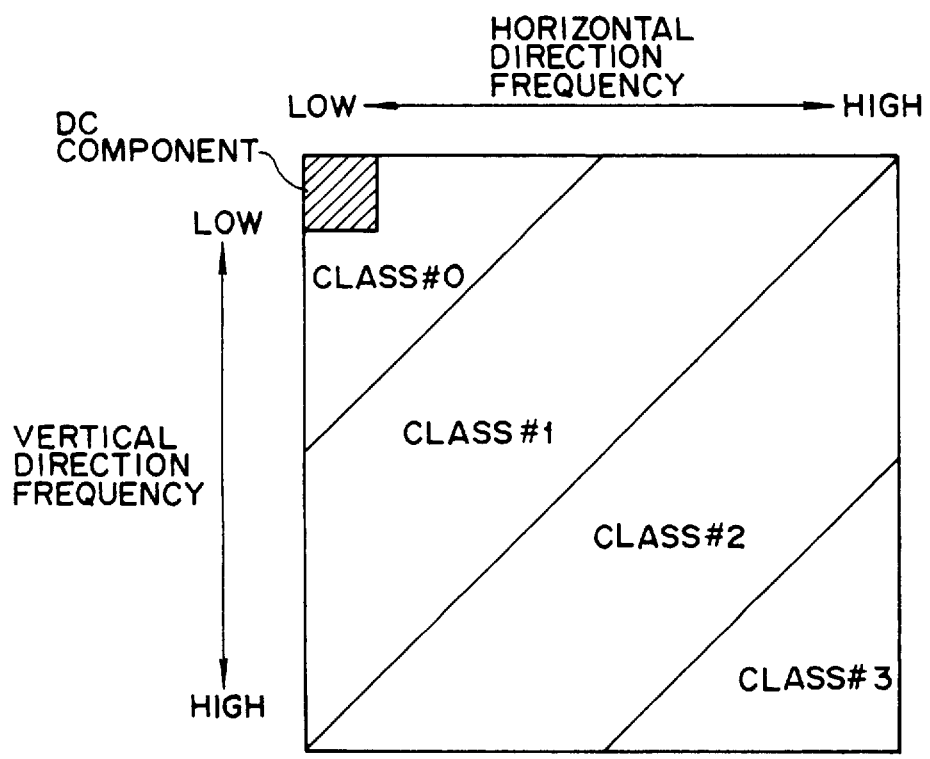
FIG. 22 is a view showing an example of divided frequency areas upon quantization.

Note that, as shown in FIG. 22, the quantizer 603 classifies conversion coefficient data from the DCT circuit 602 into a plurality of areas (four areas in FIG. 22), and quantizes data using different step widths in units of areas.

In general, the discrimination characteristics of eyes of man are sensitive to the low-frequency region but are not sensitive to the high-frequency region. Therefore, when data in the low-frequency region are quantized using a small step width, and data in the high-frequency region are quantized using a large step width, a quantization distortion is caused to concentrate on the high-frequency region of the image, thus suppressing visual deterioration of image quality.

In the divided areas shown in FIG. 22, four different quantization step widths are set from low-frequency components (class #0) to high-frequency components (class #3).

As the class # increases, the quantization step width increases.

The variable length encoding circuit 607 performs variable length encoding of the DC component from the delay circuit 606 and the quantized AC components from the quantizer 603, and outputs encoded data 608.

Note that the variable length encoding circuit 607 converts two-dimensional quantized data output from the quantizer 603 into one-dimensional data by zigzag-scanning the data from the low-frequency region to the high-frequency region, then performs variable length encoding of the converted data by run-length encoding and two-dimensional Huffman encoding, and outputs the encoded data 608. In the run-length encoding, data are reversibly compressed by counting zero runs. Also, in the Huffman encoding, short code words are assigned to data with high generation possibility, and long code words are assigned to data with low generation possibility, thereby shortening the code word length in average.

The sixth embodiment of the present invention will be described below.

Figure 23:
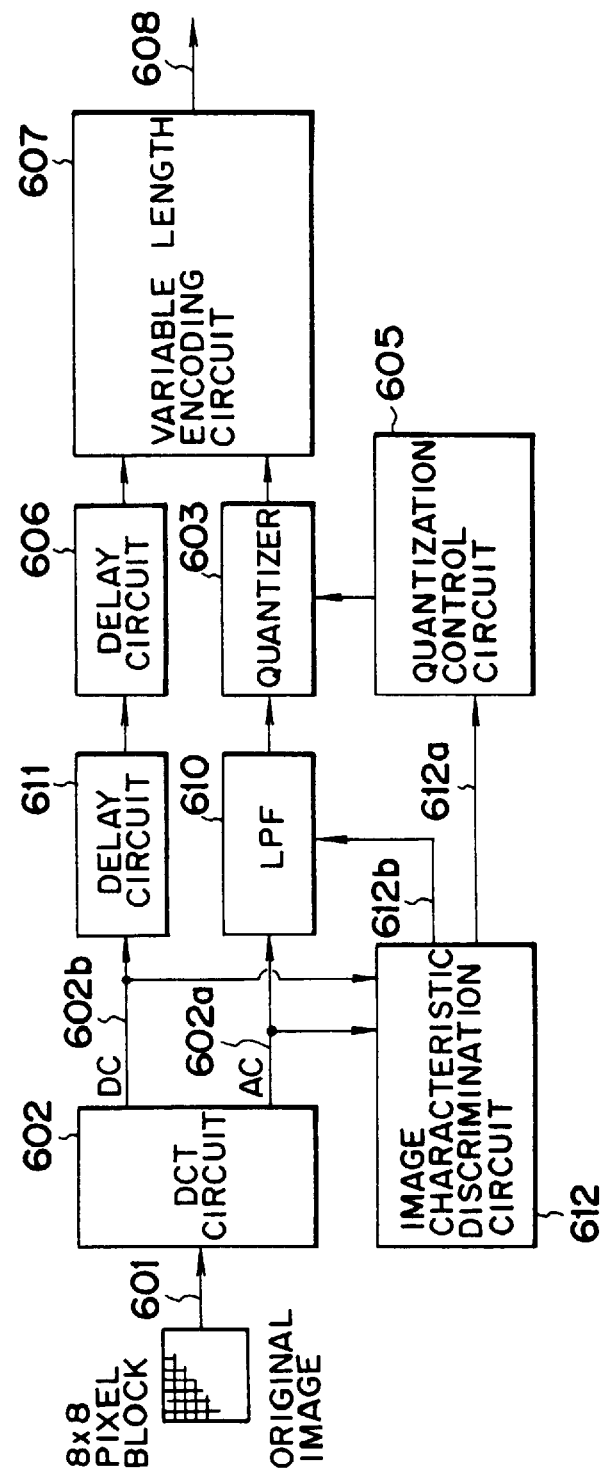
FIG. 23 is a block diagram showing the arrangement of an encoding apparatus according to the sixth embodiment of the present invention.

FIG. 23 is a block diagram showing the arrangement of an encoding apparatus according to the sixth embodiment. Note that the same reference numerals in FIG. 23 denote the same parts as in FIG. 14, and a detailed description thereof will be omitted.

Referring to FIG. 23, the encoding apparatus comprises a two-dimensional low-pass filter (LPF) 610 for selectively band-limiting the AC components 602a output from the DCT circuit 602 in a two-dimensional space in accordance with an external control signal, and a delay circuit 611 for delaying the DC component 602b output from the DCT circuit 602 by a time corresponding to the filtering time of the two-dimensional LPF 610. The output from the two-dimensional LPF 610 is supplied to the quantizer 603, and the output from the delay circuit 611 is supplied to the delay circuit 606.

The encoding apparatus also comprises an image characteristic discrimination circuit 612 for discriminating image characteristics in accordance with the AC components 602a and the DC components 602b output from the DCT circuit 602, and outputting a discrimination result 612a. The image characteristic discrimination circuit 612 also outputs a control signal 612b for controlling the two-dimensional LPF 610 in a through state or filter state in accordance with the discrimination result. The contents of the discrimination result 612a are the same as the discrimination result 604a (see FIG. 14) of the image characteristic discrimination circuit 604.

The operations of the two-dimensional LPF 610, the delay circuit 611, and the image characteristic discrimination circuit 612 will be described in detail below. The image characteristic discrimination circuit 612 systematically discriminates the activity level in accordance with the distribution of significant coefficients of the AC components 602a and the luminance discrimination result based on the DC component 602b as in the image characteristic discrimination circuit 604 (see FIG. 14), and outputs the same discrimination result 612a as the discrimination result 604a to the quantization control circuit 605.

Also, when the image characteristic discrimination circuit 612 discriminates a fine image with a low luminance, it starts the two-dimensional LPF 610 by the control signal 612b to band-limit the AC components 602a. Otherwise, the circuit 612 sets the two-dimensional LPF 610 in a through state, and causes it to output the AC components 602a after they are delayed by the same delay time as that of the delay circuit 611. Note that the delay circuit 611 delays the DC component 602b by a time corresponding to the processing time of the two-dimensional LPF 610. In the case of a fine image with a low luminance, the high-frequency components of the AC components 602a are two-dimensionally eliminated, thereby suppressing expansion, in the high-frequency region, of an image.

Thereafter, quantization and variable length encoding are executed by the quantizer 603 and the variable length encoding circuit 607 as in the embodiment shown in FIG. 14.

In the above embodiment, the activity discrimination result based on the AC components 602a is corrected based on the DC component 602b, and the quantization control circuit 605 controls the quantization characteristics of the quantizer 603 on the basis of the corrected discrimination result. Alternatively, the image characteristics may be discriminated using only the Ac components, and classes of quantization areas may be changed based on the DC component.

Figure 24A:
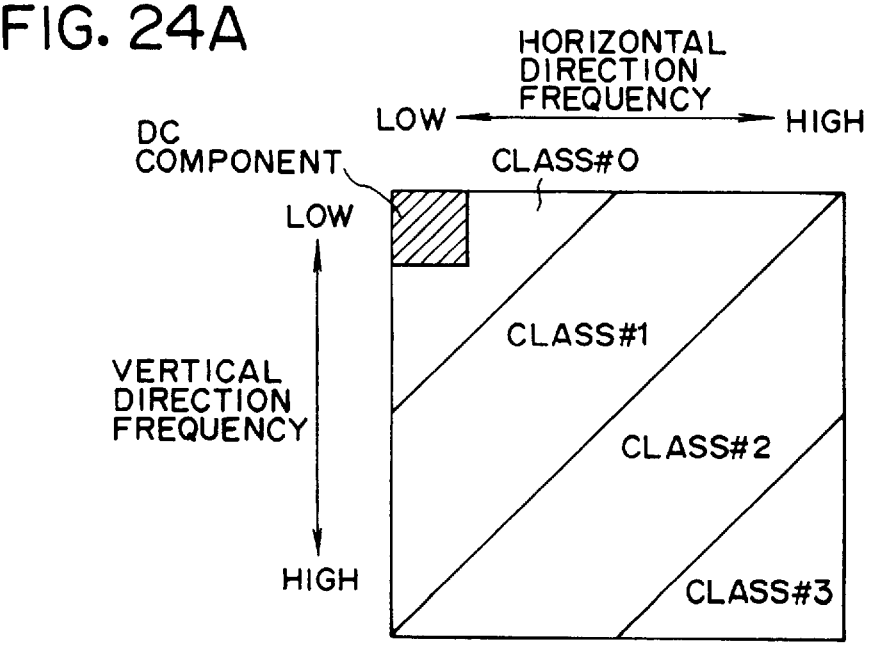
FIGS. 24A and 24B are explanatory views of an adaptive change of divided frequency areas.
Figure 24B:
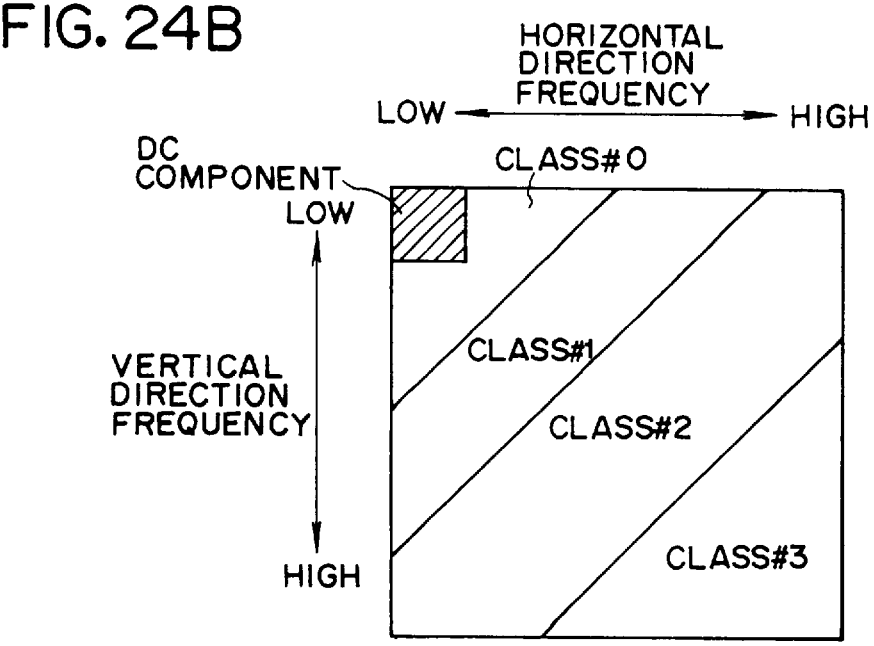

The operation of this embodiment will be described below with reference to FIGS. 24A and 24B. When the activity level of an image is discriminated by the AC components, and it is discriminated based on the DC component that the image has a low luminance as a whole, areas are changed to increase the quantization step widths of middle- and high-luminance quantization areas (the areas are changed from FIG. 24A to FIG. 24B).

In this manner, when quantization classes of local fine image data are changed in accordance with the DC component, if the image has a low luminance, data in the low-frequency region can be quantized using a small step width and data in the high-frequency region can be quantized using a large step width, thus realizing processing matching with visual characteristics.

Figure 25A:
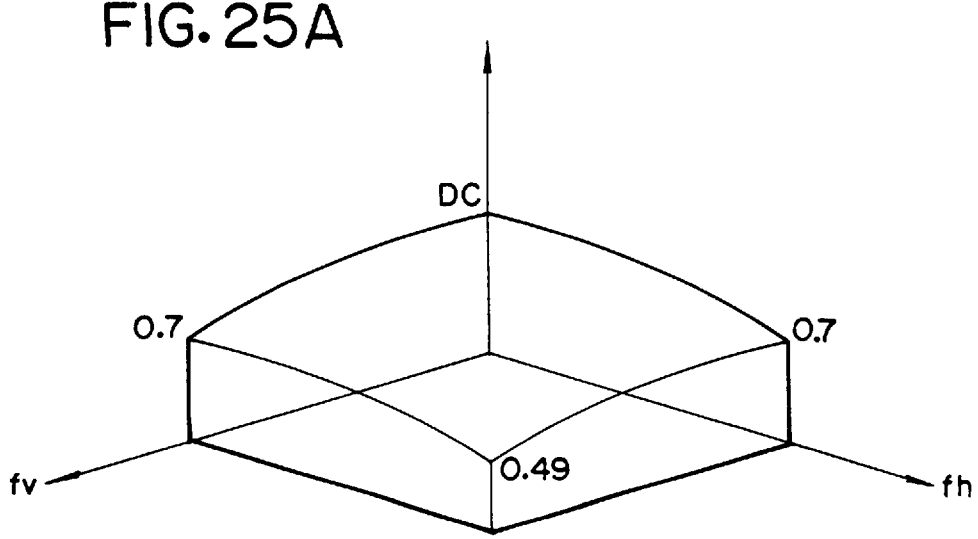
FIGS. 25A and 25B are explanatory views of a change in DCT weighting coefficient.

Also, weighting coefficients for decreasing high-frequency components as compared to those applied to low-frequency components may be applied to the high-frequency components in accordance with the DC component. This embodiment will be described in detail below with reference to FIGS. 25A and 25B. FIG. 25A shows a three-dimensional expression of conventional weighting coefficients for DCT conversion coefficient data, and FIG. 25B shows a three-dimensional expression of weighting coefficients according to this embodiment.

In FIG. 25A, the weighting coefficients for the highest frequency components in the horizontal and vertical directions are 0.7 with respect to a DC value, and hence, the weighting coefficient for the highest frequency component in the diagonal direction is 0.49 (=0.7×0.7).

Figure 25B:
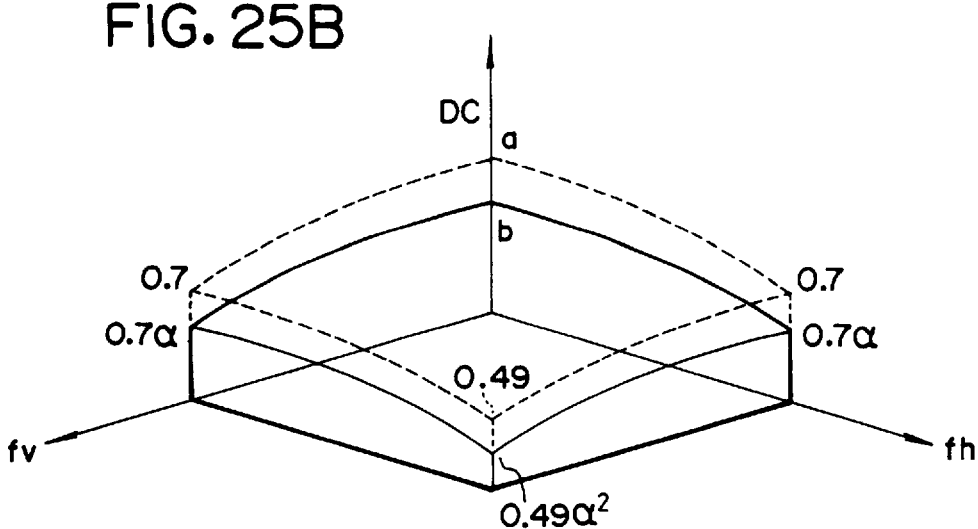

In contrast to this, according to this embodiment, as shown in FIG. 25B, when the DC level is lowered from a to b, and a low luminance is determined, the weighting coefficients for the horizontal and vertical frequencies are multiplied with a coefficient $\alpha(0<\alpha<1)$, thereby eliminating significant coefficients of the high-frequency components. More specifically, the DCT weighting coefficients themselves are adaptively changed in accordance with the DC component like by calculating 0.7 $\alpha$ on the horizontal and vertical frequency axes and 0.7 $\alpha \times 0.7$ $\alpha$ for the limit frequency component in the diagonal direction. Thus, the significant coefficients of the high-frequency components can become close to 0 at low luminances.

As can be easily understood from the above description, according to the fifth and sixth embodiments, the visual S/N ratio of a locally fine image with a low luminance can be improved. Since the code amount of the low-luminance components can be decreased, encoding efficiency can be improved as a whole.

The seventh embodiment of the present invention will be described below.

FIG. 26 is a block diagram showing the arrangement of an encoding apparatus according to the seventh embodiment.

Referring to FIG. 26, image data input from an input terminal 701 is divided into blocks each consisting of 8 pixels (horizontal)×8 pixels (vertical) by a block forming unit 702. The image data blocks are converted by an orthogonal conversion unit 703. For example, this orthogonal conversion unit 703 adopts an orthogonal conversion encoding method called discrete cosine transform (to be referred to as DCT hereinafter).

The image data blocks from the block forming unit 702 are also supplied to a movement detector 710. The movement detector 710 detects a movement of each block, and outputs the movement detection value to a classification unit 711.

The classification unit 711 classifies blocks to be processed into four classes in accordance with the information amounts of the blocks (fineness of images of the blocks), and outputs the classified blocks to quantizers 704a, 704b, 704c, and 704d and also to a multiplexer 709. As the classification method of the classification unit 711, a method of classifying blocks on the basis of a maximum value of the absolute values of AC components of DC conversion data, a method of classifying blocks on the basis of a square sum of AC components, and the like are used. In this embodiment, the blocks are classified into four classes, and the quantization step width increases from class 0 toward class 3.

The quantizers 704a, 704b, 704c, and 704d having different quantization step widths quantize orthogonally converted image data using the quantization step widths shown in FIG. 27 in correspondence with classes.

More specifically, a block having a large information amount is quantized using a large quantization step width, so as to make the information amount generated by each block constant, thereby uniforming image quality.

Figures 28, 29:
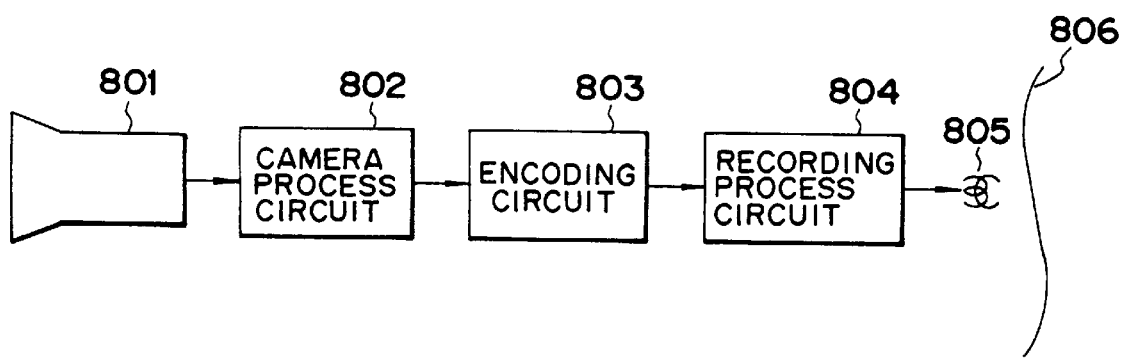
FIG. 28 is a view for explaining an operation for changing classes in the seventh embodiment.
FIG. 29 is a block diagram of a VTR adopting an encoding apparatus according to the present invention.

In the classification unit 711, when the movement is large, since the visual characteristics of man are lowered, the values of the classes shown in FIG. 27 are changed to those with larger quantization step widths, as shown in FIG. 28, and are output to the quantizers 704a, 704b, 704c, and 704d and the multiplexer 709, so that quantization is performed based on larger quantization step widths. For example, when it is determined that an image which is normally determined to be class 1, has a large movement, its class is changed to class 2, and quantization of this image is performed based on a larger quantization step width than normal.

In this manner, since the values of the classes are changed in correspondence with the movement amount, the quantization step widths shown in FIG. 27 are changed to those shown in FIG. 28, and an image with a large movement can be quantized using a larger quantization step width.

The quantized data are output to a selector 705, and are also output to delay units 706a, 706b, 706c, and 706d. The delay units 706a, 706b, 706c, and 706d delay the quantized data until the output result of the selector 705 appears, and then output the delayed data to terminals 707a, 707b, 707c, and 707d of a switch 707. The selector 705 switches the switch 707 to select a quantizer which can realize a predetermined information amount or less in predetermined processing units (e.g., 30 blocks), and outputs the selected quantizer number to the multiplexer 709. A variable length encoder 708 assigns code words in accordance with the frequencies of generated codes. That is, short code words are assigned to codes with a high generation frequency, and long code words are assigned to data with a low generation frequency, thereby reducing the information amount to be generated. The encoder 708 outputs the encoded data to the multiplexer 709.

The multiplexer 709 multiplexes the compressed image data, and the class value output from the classification unit 711, and the quantizer number output from the selector 705, and outputs the multiplexed data from an output terminal 712.

As described above, according to the seventh embodiment, since a movement of each block is detected, and the class value of each block is changed in accordance with this movement information, an actual quantization step width can be switched without adding any new change information. Since the quantization step width is selected in accordance with the movement amount of an image, the image quality levels of a block with a large movement and a block with a small movement can be uniformed, and image quality can be improved.

Note that various other changes and modifications may be made without departing from the spirit and scope of the invention.

For example, the encoding apparatus described in each of the above embodiments may be applied to a video camera, a digital VTR, and the like.

For example, FIG. 29 is a block diagram of a camera integrated VTR which comprises the encoding apparatus described in each of the above embodiments.

Referring to FIG. 29, the VTR comprises an image pickup unit 801 for converting optical information into an electrical signal, a camera process circuit 802 for executing predetermined processing of the signal output from the image pickup unit, and outputting a video signal, an encoding circuit 803 which adopts the encoding method of each of the above embodiments, a recording process circuit 804 for executing predetermined processing (e.g., digital modulation) for recording, a recording head 805, and a magnetic tape 806 as a recording medium.

With the above-mentioned arrangement, the encoding apparatus of each of the above embodiments can be applied to the camera integrated VTR.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A code amount control device comprising:

input means for inputting information data in predetermined units;

code amount estimation means having a plurality of stages including a final stage, each for estimating a code amount;

calculation means for obtaining a calculation result based on a target code amount and the estimated code amount, for each stage of said code amount estimation means;

updating means for updating a short code amount and an excess code amount based on the calculation result from said calculation means; and control means for controlling quantization parameters used upon encoding in accordance with the short code amount and the excess code amount obtained at the final stage of said code amount estimation means.

2. A device according to claim 1, further comprising:

encoding means for encoding the information data using the quantization parameters controlled by said control means.

3. A device according to claim 2, further comprising:

recording means for recording encoded data encoded by said encoding means.

4. A device according to claim 2, wherein said encoding means comprises orthogonal conversion means for orthogonally converting the information data.

5. A device according to claim 4, wherein the information data is image data, and said orthogonal conversion means performs DCT conversion.

6. A device according to claim 1, wherein said input means comprises image pickup means for electrically converting an optical image.

7. A code amount control device according to claim 1, wherein the short code amount and the excess code amount for a stage of said code amount estimation means corresponds to the short code amount and the excess code amount for a preceding stage of said code amount estimating means, respectively, as updated by said updating means.

8. A code amount control device for controlling a code amount in units of second blocks, each consisting of a plurality of first blocks, each consisting of a plurality of sample value data, comprising:

quantization means for quantizing the sample value data in units of the second block using quantization parameters that are predetermined;

estimation means for estimating, on a unit basis of the second block, an amount of code data which results from encoding the sample value data quantized by said quantization means; and control means for controlling the quantization parameters in units of the first block in accordance with an output from said estimation means.

9. A device according to claim 8, further comprising:

encoding means for encoding the first block data using the quantization parameters controlled by said control means.

10. A device according to claim 9, further comprising:

recording means for recording encoded data encoded by said encoding means on a recording medium.

11. A device according to claim 9, wherein the sample value data is image data.

12. A device according to claim 11, wherein said encoding means comprises orthogonal conversion means for orthogonally converting the first block data.

13. A code amount control method comprising:

an input step of inputting information data in predetermined units;

a code amount estimation step of estimating a code amount in each of a plurality of stages including a final stage;

a calculation step of obtaining a calculation result based on a target code amount and the estimated code amount, for each stage of said code amount estimation step;

an updating step of updating a short code amount and an excess code amount based on the calculation result of said calculation step; and a control step of controlling quantization parameters used upon encoding in accordance with the short code amount and the excess amount obtained at the final stage of said code amount estimation step.

14. A code amount control method according to claim 13, wherein the short code amount and the excess code amount for a stage of said code amount estimation step corresponds to the short code amount and the excess code amount for a preceding stage of said code amount estimating step, respectively, as updated in said updating step.

15. A code amount control method for controlling a code amount in units of second blocks, each consisting of a plurality of first blocks, each consisting of a plurality of sample value data, comprising:

a quantization step of quantizing the sample value data in units of the second block using quantization parameters that are predetermined;

an estimation step of estimating, on a unit basis of the second block, a code amount of data which results from encoding the sample value data quantized in said quantization step; and a control step of controlling the quantization parameters in units of the first block in accordance with an output of said estimation step.

16. An apparatus for predicting and finely adjusting a quantization parameter, comprising:

input means for inputting information data;

block forming means for dividing the information data into blocks, each block comprising a plurality of the information data;

prediction means for predicting, on the unit basis of m blocks of the information data, an initial value for a quantization parameter, wherein the quantization parameter is to be used for quantizing the information data so as to obtain code data from the quantized information data whose code amount is within a predetermined amount, and wherein m is an integer; and adjustment means for finely adjusting the initial value, on the unit basis of n blocks of the information data wherein n is an integer and 1<n<m, to provide the quantization parameter.

17. An apparatus according to claim 16, further comprising encoding means for encoding the blocks of information data using the quantization parameter to provide the code data.

18. An apparatus according to claim 17, wherein said encoding means includes orthogonal conversion means for orthogonally converting the blocks of information data to provide the code data.

19. An apparatus according to claim 17, further comprising recording means for recording the code data on a recording medium.

20. An apparatus according to claim 16, wherein the information data is image data.

21. An apparatus according to claim 20, wherein said input means includes image pickup means for electrically converting an optical image to provide the image data.

22. A method for predicting and finely adjusting a quantization parameter, comprising the steps of:

inputting information data;

dividing the information data into blocks, each block comprising a plurality of the information data;

predicting, on the unit basis of m blocks of the information data, an initial value for a quantization parameter, wherein the quantization parameter is to be used for quantizing the information data so as to obtain code data from the quantized information data whose code amount is within a predetermined amount, and wherein m is an integer; and finely adjusting the initial value, on the unit basis of n blocks of the information data wherein n is an integer and 1<n<m, to provide the quantization parameter.

* * * * *